(12) United States Patent
Seith et al.

(10) Patent No.: US 11,806,848 B2
(45) Date of Patent: Nov. 7, 2023

(54) PNEUMATIC IMPACT WITH LIGHT

(71) Applicant: INGERSOLL-RAND INDUSTRIAL U.S., INC., Davidson, NC (US)

(72) Inventors: Warren A. Seith, Bethlehem, PA (US); Huajun Tao, Shanghai (CN); Yunzhong Yu, Shanghai (CN); Jinzhong Yang, Shanghai (CN)

(73) Assignee: Ingersoll-Rand Industrial, Inc., Davidson, NC (US)

( * ) Notice: Subject to any disclaimer, the term of this patent is extended or adjusted under 35 U.S.C. 154(b) by 321 days.

(21) Appl. No.: 16/570,653

(22) Filed: Sep. 13, 2019

(65) Prior Publication Data

US 2021/0078148 A1 Mar. 18, 2021

(51) Int. Cl.
*B25B 23/18* (2006.01)
*B25B 21/02* (2006.01)
*H02K 7/14* (2006.01)
*F21L 13/06* (2006.01)
*F21S 9/04* (2006.01)

(52) U.S. Cl.
CPC ............. *B25B 23/18* (2013.01); *B25B 21/02* (2013.01); *B25B 21/023* (2013.01); *F21L 13/06* (2013.01); *F21S 9/04* (2013.01); *H02K 7/145* (2013.01)

(58) Field of Classification Search
CPC ..... B25B 21/023; B25B 21/02; B25B 21/026; B25B 23/18; F21L 13/06; F21S 9/04; H02K 7/145
See application file for complete search history.

(56) References Cited

U.S. PATENT DOCUMENTS

| 4,678,922 | A | * | 7/1987 | Leininger | F03D 80/70 290/54 |
| 5,267,129 | A | * | 11/1993 | Anderson | B25F 5/021 362/192 |
| 5,525,842 | A | * | 6/1996 | Leininger | B25F 5/00 290/54 |
| 7,095,142 | B2 | * | 8/2006 | Leininger | H02K 7/183 310/47 |
| 8,212,445 | B2 | * | 7/2012 | Ritchey | H02K 1/08 310/112 |
| 2007/0289760 | A1 | * | 12/2007 | Sterling | B25F 5/00 173/104 |
| 2010/0064864 | A1 | * | 3/2010 | Kobayashi | B25B 21/02 81/464 |
| 2010/0101815 | A1 | * | 4/2010 | Kobayashi | B25B 21/004 173/112 |

(Continued)

*Primary Examiner* — Andrew M Tecco
*Assistant Examiner* — Nicholas E Igbokwe
(74) *Attorney, Agent, or Firm* — Kevin E. West; Advent, LLP

(57) ABSTRACT

A pneumatically driven tool (e.g., an impact tool) includes a pneumatically driven motor; an electric generator generating electrical power from movement of the pneumatically driven motor, or an impact mechanism connected thereto; and an on-board light that is powered by the generated electrical power. The pneumatically driven motor is rotated by compressed air or gas and drives an impact mechanism with one or more hammers and an anvil. Impact of the hammer(s) with the anvil, in turn, move an output shaft of the pneumatically driven tool. The electric generator harnesses the rotational movement of the pneumatically driven motor and/or the impact mechanism to electrically power the on-board light.

16 Claims, 22 Drawing Sheets

(56) References Cited

U.S. PATENT DOCUMENTS

| | | | |
|---|---|---|---|
| 2011/0109093 A1* | 5/2011 | Leininger | B25F 5/021 |
| | | | 290/55 |
| 2014/0036482 A1* | 2/2014 | Vanko | B25B 23/18 |
| | | | 362/119 |
| 2014/0070769 A1* | 3/2014 | Harada | B60L 50/16 |
| | | | 320/109 |
| 2016/0354905 A1* | 12/2016 | Ely | B25B 21/02 |

* cited by examiner

PNEUMATIC IMPACT WITH LIGHT

TECHNICAL FIELD

The present disclosed generally relates to impact tools and, more specifically, to pneumatically powered impact tools with on-board lights that are electrically powered by electric generators utilizing mechanical movement of internal components of the tool to generate electrical power for the on-board lights.

BACKGROUND

A pneumatic impact tool is a power tool that delivers a high torque output with minimal exertion by the user. For example, a pneumatic impact wrench generally includes a motor coupled to an impact mechanism that converts the torque of the motor into a series of powerful rotary strikes directed from one or more hammers to an anvil integral with an output shaft. The output shaft may be coupled (for example, via a socket) to a fastener (e.g., bolt, screw, nut, etc.) to be tightened or loosened, and each strike of the hammer on the anvil provides torque to the fastener. The intermittent nature of impact loading of an impact wrench enables it to deliver higher torque to a fastener than a constant-drive tool, such as an electrical drill.

Impact wrenches are widely used in many industries, such as automotive repair, heavy equipment maintenance, product assembly, major construction projects, and other instances where a high torque output is needed. Frequently, impact tools are used in tight spaces where there is very little light. While attempting to engage a fastener with a socket or other driver connected to the impact tool, users often struggle to see the fasteners they are attempting to engage. Thus, the users often hold a flashlight in one hand while using the other to operate the impact tool. Not only is this inconvenient, it is also dangerous due to the high-torque output provided of the impact tool, as well as the fact that such tools are used to work on complex machinery and industrial equipment.

Some electrical tools include an on-board light that is powered by the drill's electrical power. But purely pneumatic tools do not have an electrical power source, relying instead on pressurized air or gasses to provide the mechanical force to move their internal motors. As a result, users of pneumatic tools are limited to external sources of light to illuminate targeted fasteners. In some instances, clip on rechargeable lights have been added to pneumatic tools, but these systems require recharging of the battery systems they use.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Aspects disclosed herein generally relate to a pneumatically driven tool (e.g., an impact tool) with an on-board light that is powered by an electric generator capable of generating electrical power from a pneumatically driven motor within the tool. The pneumatically driven motor, which is rotated by compressed air or gas—not electrical power, drives an impact mechanism with one or more hammers and an anvil. Impact of the hammer(s) with the anvil, in turn, move an output shaft of the pneumatically driven tool. An electric generator is placed in the pneumatically driven tool to convert the rotational movement of the pneumatically driven motor, impact mechanism, and/or other component into electrical power that can be used to power the on-board light. More specifically, the electric generator includes a generator stator with one or more inductive coils and a generator rotor with one or more magnets, or vice versa. The generator rotor is rotated by the pneumatically driven motor, impact mechanism, or other component relative to the generator stator. Electrical power is electromagnetically induced across a magnetic air gap between the two, and the so-generated electrical power may be selectively used to power the on-board light. Optionally, a clutch may be used to engage and disengage the generator rotor with the rotating pneumatically driven motor and/or the impact mechanism, thereby protecting the electric generator from rapid deceleration in the drive train of the pneumatically driven tool.

BRIEF DESCRIPTION OF THE DRAWINGS

The disclosed examples are described in detail below with reference to the accompanying drawing figures listed below.

DETAILED DESCRIPTION

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Figure 1A:
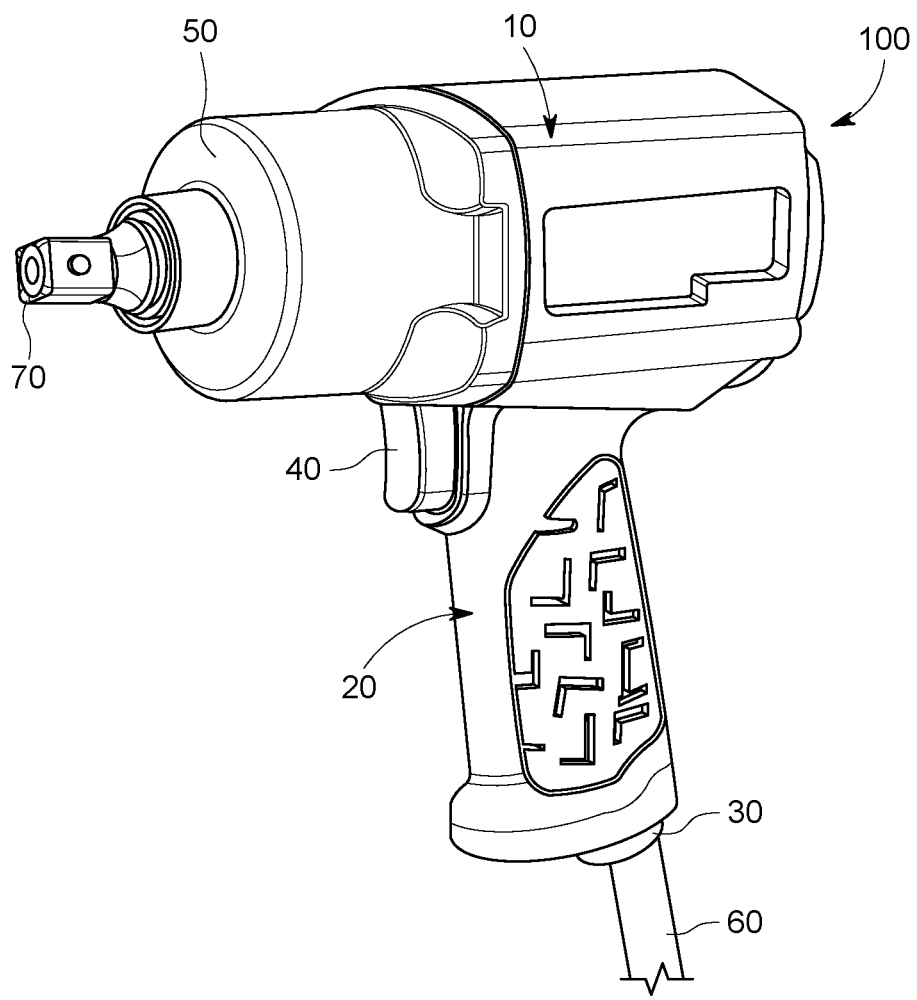
FIG. 1A illustrates a perspective view of a pneumatic tool with an on-board light powered by an internal electric generator.

FIG. 1A illustrates a perspective view of an impact tool 100 in accordance with some of the disclosed embodiments. The disclosed embodiments are not limited to any particular type of impact tool 100. While an impact wrench is shown in FIG. 1, and used as an example throughout this disclosure, the on-board lights and internal electric generators discussed herein may be added to any pneumatically driven tool. For example, the impact tool 100 may alternatively be an air ratchet, airbrush, air hammer, pile driver, angel grinder, backfill tamper, nail gun, jackhammer, pneumatic hammer, pneumatic drill, pneumatic jack, pneumatic paint shaker, pneumatic riveter, sander, sandblaster, paint sprayer, riveting hammer, needle scaler, or any other tool that is driven by compressed air, gas, or other pneumatic. While impact tool 100 is discussed throughout this disclosed, embodiments are not solely limited to impact tools. Any pneumatically driven tool may be used.

Specifically, the impact tool 100 includes an upper chamber or housing 10, a handle 20, a pneumatic coupling 30, a trigger switch 40, a light 50, a detachable supply hose 60, and an output shaft 70. The supply hose 60 may be connected to a supply of compressed air or gas (air/gas) that is directed through the pneumatic coupling 30, up through the handle 20, and into the upper chamber 10. As discussed in more detail below, the compressed air/gas is used to rotate or otherwise move a motor and impact mechanism in the upper chamber 10 to rotate the output shaft 70. The output shaft 70 may include any number of attachments, such as a socket, wrench, drill, hammer, or other tool head. Additionally, in some embodiments, movement of the pneumatically driven motor is also used by an electric generator—positioned either in the upper chamber 10 or the handle 20—to power the light 50. Thus, the pneumatics used to physically turn the output shaft 70 are also used to generate electricity for powering the light 50, and no outside electrical connection is needed.

As discussed in more detail below, the light 50 is electrically powered through an internal electric generator that, in some embodiments, converts rotational motion of the tool's motor into electrical power. Some embodiments include a three-phase (or the like) electrical generator that induces electrical power from the rotation of one or more magnets in proximity to inductive coils. This harvested electrical power may then be stored (e.g., in a capacitor or rechargeable battery) and used to power the light 50, either continuously or selectively using the light switch 40.

The light 50 provides a light source focused in the direction of the output shaft 70, illuminating work being performed by a user. In some embodiments, the light 50 is a light emitting diode (LED) shaped in a ring formation around the output shaft 70. Other embodiments use alternative types of lights (e.g., organic LED (OLED), liquid crystal display (LCD), incandescent bulb, or the like). Further still, some embodiments position the light 50 in alternative shapes (e.g., square, rectangle, triangle, diamond, etc.). While other embodiments position lights around the output shaft 70 or elsewhere on impact tool 100. While a circular LED light 50 is shown, any type of light pattern, source, and positioning may be used.

The trigger switch 40 enables the user to both switch the on-board light 50 on or off at the user's discretion and also rotate the output shaft 70 through selectively supplying compressed air/gas. Users (e.g., mechanics) typically are holding fasteners in their other hand when operating the impact tool 100. Therefore, the single trigger switch 40 may perform dual functions: turning on the light 50 and rotating the output shaft 70. In some embodiments, pulling the trigger switch 40 an initial distance (e.g., ⅛ inch, ⅛ of a full pull, or the like) turns on the light 50 by supplying electrical power generated by the internal electric generator thereto. Alternatively or additionally, this initial or partial pull of the trigger (referenced herein as a "light pull") may either power the light 50 from stored electrical power in a capacitor or rechargeable battery or from an initial blast of compressed air/gas that is used to rotate the tool motor just for electric power generation, in some embodiments accomplishing either without rotating the output shaft. For example, about 1 second of electric generator operations in some embodiments was shown to be enough power for 43 seconds of lighting of for an LED light source as light 50, using two 2.5 F supercapacitors as energy storage. Using the pneumatics of the impact tool 100 to spin the internal electric generator before rotation of the output shaft 70, in some embodiments, allows an operator to use the light 50 as a flashlight without having to drive the mechanics of the impact tool 100. Alternative embodiments do not allow for light pulls, instead using any pull of the trigger switch 40 to supply harnessed electrical power to the light 50. Other embodiments may include separate switches for operating the light 50 and operating the pneumatics powering the motor of the impact tool 100. These additional switches may be placed on the exterior of the handle 20 or the upper housing 10.

Figure 1B:
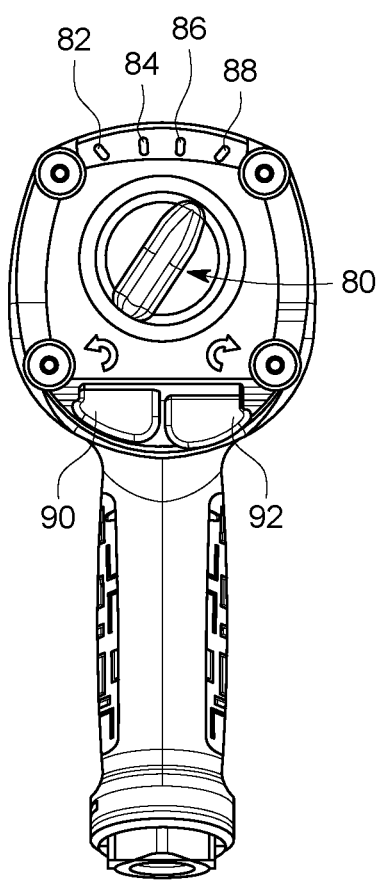
FIG. 1B illustrates a rear view of a pneumatic tool with an on-board light powered by an internal electric generator.

FIG. 1B illustrates a perspective view of the back of the impact tool 100. The impact tool includes various motor controls. Dial 80 allows a user to the switch between different power modes for rotating the output shaft 70 at different speeds, as indicated by markings 82, 84, 86, and 88. In operation, these different power modes 82, 84, 86, and 88 vary the amount of compressed air/gas supplied the tools' motor to control rotational speed of the output shaft 70. Additionally or alternatively, buttons 90 and 92 provide directional controls for rotating the output shaft 70 either clockwise (button 92) or counterclockwise (button 90) to fasten or loosen different fasteners, respectively.

Figure 2:
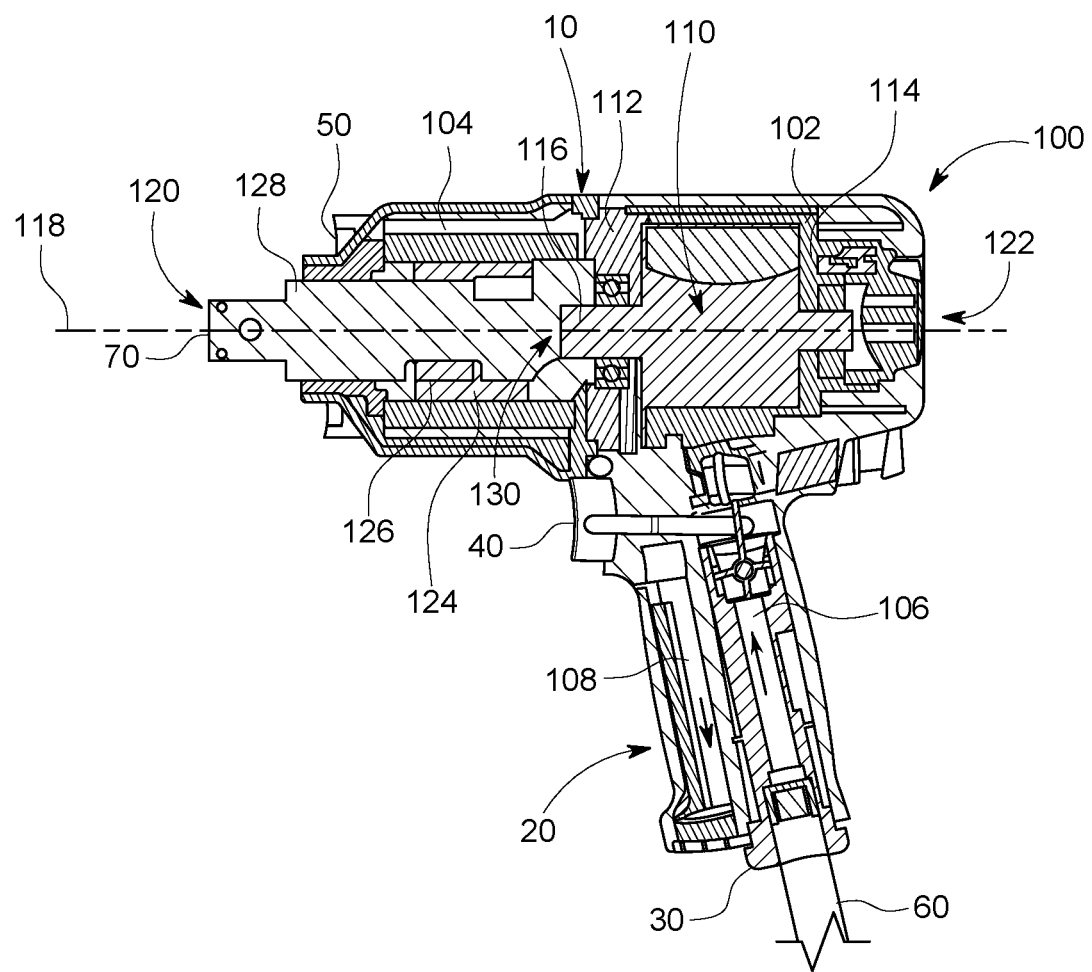
FIG. 2 illustrates a cross-sectional view of a pneumatic tool with an on-board light that can be powered by an internal electric generator.

FIG. 2 illustrates a cross-sectional view of the impact tool 100. The impact tool 100 includes the upper chamber 10, the handle 20, the pneumatic coupling 30, the trigger switch 40, the light 50, the detachable supply hose 60, and the output shaft 70. A motor housing 102 and an impact mechanism 104 are positioned within the upper chamber 10. Also, in some embodiments, the handle defines an input chamber 106 for compressed air/gas to be supplied to impact tool 100 and an exhaust chamber 108 for the compressed air/gas to exit the impact tool 100—as referenced by the directional arrows in both.

The motor housing 102 includes motor 110 that is pneumatically driven by the compressed air/gas directed through the handle 20. In the illustrative embodiment, the motor 110 is secured within the upper chamber by front motor endplate (or endbell) 112 and rear motor endplate (or endbell) 114. The motor endplates 112 and 114 may securely hold the motor 110 in place within the upper chamber 10. It will be appreciated that, in other embodiments, other mechanisms for securing the motor 102 may be used.

The motor 110 includes a motor drive shaft 116 positioned along a longitudinal axis 118 defined through the upper housing 10 through the middle of the output shaft 70. As illustratively shown, the longitudinal axis 118 extends from a front output end 120 of the impact tool 100 to a rear end 122 of the impact tool 100. In operation, the motor 110 rotates the motor drive shaft 116 that, in turn, rotates the impact mechanism 104, or portions thereof. The motor drive shaft 110 may include a plurality of fins or vanes that are configured to be pneumatically driven by the compressed air or gas.

In the illustrated embodiment, the motor shaft 116 has a generally annular shape and is coupled to and rotates the hammers 124 and 126. The motor shaft 116 is configured to rotate about the longitudinal axis 118 within the front endplate 112 in response to the supplied compressed air/gas rotating the motor 110. A number of bearings (not shown) may be used in some embodiments along the longitudinal axis 118 to facilitate rotation of the motor shaft 116 or other components. It will be appreciated that the shape, location, and number of the bearings may vary depending on the particular embodiment The impact mechanism 104 generally includes hammers 124 and 126 and an anvil 128 that is coupled to the output shaft 70. The depicted impact mechanism is just one embodiment that may be used. Alternative embodiments use a single hammer to strike and rotate the anvil 128. Other embodiments use more than two hammers to strike the anvil. In operation, the hammers 124 and 126 are rotatable about the longitudinal axis 118 and are configured to impact the anvil 128, thereby driving rotation of the anvil 128 about the longitudinal axis 118.

In some embodiments, the anvil 128 is integrally formed with the output shaft 70 and a at least one impact face 130 which is struck by the one or more hammers 124 and 126. In other embodiments, the anvil 128 and the output shaft 70 may be formed separately and coupled to one another. In such embodiments, the output shaft 70 is configured to rotate as a result of corresponding rotation of the anvil 128. The output shaft 70 may be configured to mate with a socket (e.g., for use in tightening and loosening fasteners, such as bolts). Although the output shaft 70 is shown as a square drive output shaft, the principles of the present disclosure may be applied to an output shaft 70 of any suitable size and shape. The motor 110 and the impact mechanism 104 are adapted to rotate the output shaft 70 in both clockwise and counterclockwise directions, for tightening or loosening various fasteners.

The light 50 is embedded within or affixed to an outer casing of the upper housing 10. The light 50 may be attached to the outer casing of the upper housing 10 in a number of ways. For example, the light 50 may be press- or interference-fitted, glued, fastened, or screwed into place. The light 50 may be permanently embedded into the impact tool or releasably attached. The latter allows users to remove the light 50 from the impact tool 100, as it may be charged by the electric generators mentioned below, and used at the will of the operator.

Figure 3:
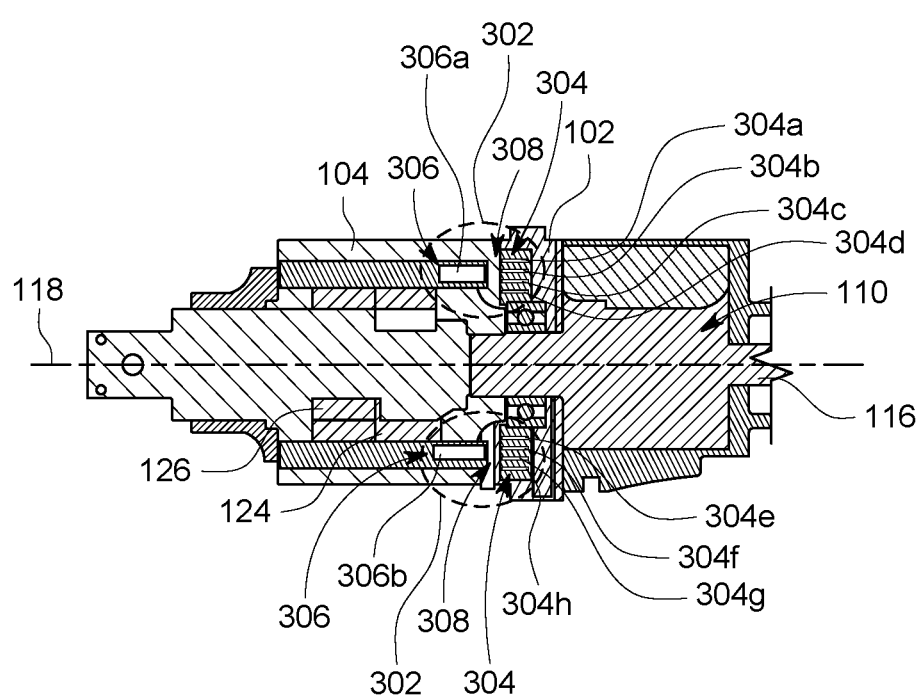
FIG. 3 illustrates a cross-sectional view of an impact mechanism, a motor, and an electric generator for a pneumatic tool with an on-board light.
Figure 4:
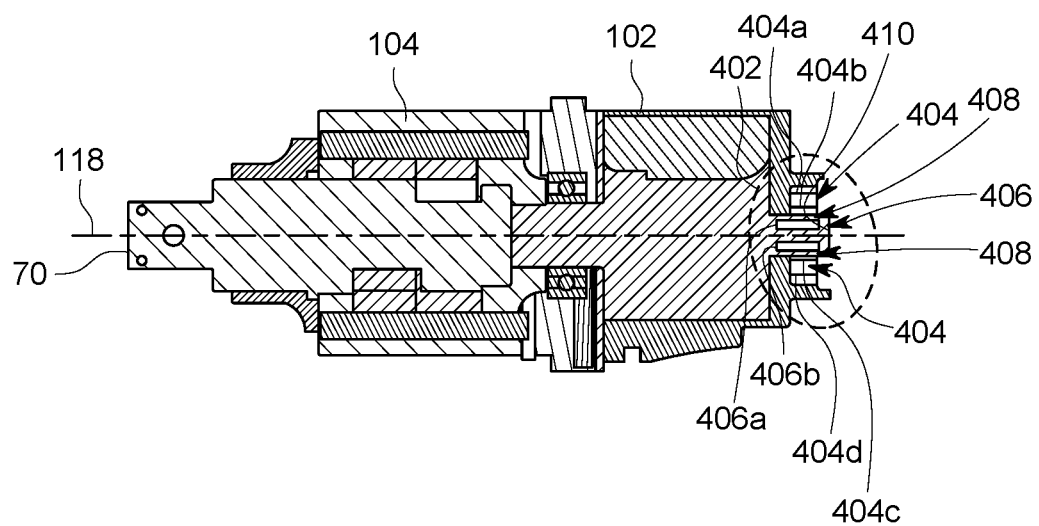
FIG. 4 illustrates a cross-sectional view of an impact mechanism, a motor, and an electric generator for a pneumatic tool with an on-board light.

In some embodiments, the light 50 is electrically powered by the electric generators shown in FIGS. 3-4 that harvests energy from rotational movement inside the impact tool 100. In general, the electric generators disclosed herein include a stator and a rotor with inductive coils (or windings) being placed within a magnetic air gap of one or more magnets. Movement of the inductive coils relative to the magnet(s), or vice versa, induces electric current in the inductive coils that may then be stored and used by the disclosed impact tools 100 to electrically power the light 50. In some embodiments, the electric generator is a brushless three-phase generator. For example, the electric generator may be a brushless three-phase generator capable of generating 20V at 8,000 revolutions per minute (RPM). Other AC generators (e.g., single- or poly-phase) or DC generators (e.g., shunt, series, or compound-wound) may be used.

The electric generator may be placed in several different locations inside the impact tool 100. For example, the electric generator may be placed within the motor housing 102, within the impact mechanism 104, between and/or integrated with the motor housing 102 and the impact mechanism 104, between the impact mechanism 104 and the motor housing 102, or on the back of the motor housing 102. Different examples are shown in FIGS. 3-4. These embodiments harness rotational movement of either the motor 110, the motor drive shaft 116, and/or the impact mechanism 104 to rotate a generator rotor for inducing electrical power. Alternatively, some embodiments position the electric generator in the exhaust chamber 108 of the handle 102, where return compressed air/gas that has rotated the motor 110 is used to then rotate the generator rotor before exiting the impact tool 100. In some embodiments, the generator and/or drive components coupled to the generator may be positioned in the input chamber 106 of the tool 100. Further, in other embodiments, the generator and/or drive components coupled to the generator may be positioned at other positions in the tool 100 in communication with either the pneumatic feed gas or the pneumatic exit gas.

FIG. 3 illustrates a cross-sectional view of the motor housing 102 and the impact mechanism 104, with an electric generator 302 for harvesting electrical power to supply the light 50. In some embodiments, the electric generator 302 comprises: (1) a generator stator 304 that includes a plurality of inductive coils 304*a-h*, and (2) a generator rotor 306 that includes one or more magnets 306*a-b*. In the illustrated embodiment, the generator stator 304 is positioned inside the motor housing 102, which remains stationary while the motor 110, including particularly motor drive shaft 116, is rotated by the supplied compressed air/gas. In some embodiments the generator status 304 is incorporated into a motor endbell _____ or motor endplate _____ of the motor _____. Alternatively, the generator stator 304 may be externally attached to the motor housing 102, facing the impact mechanism 104.

The motor 110 rotates the motor drive shaft 116, which, in turn, rotates the impact mechanism 104, in some embodiments. Rotation of the impact mechanism 104 also rotates the magnets 306*a-b* of the generator rotor 306. These rotating magnets 306*a-b* may be positioned in the impact mechanism 104, and more particularly may be positioned in a housing 105 of the impact mechanism 104 adjacent the motor housing 102, and are separated from the inductive coils 304*a-h* by a magnetic air gap 308 along, in some embodiments, the direction of the longitudinal axis 118

(referred to herein as the "axial magnetic air gap" 308). An electrical current is induced in the inductive coils 304a-h by the rotating magnets 306a-b. Although only two magnets 306 a-b are shown in FIG. 3, the generator rotor 306 may comprise more than two magnets and may comprise an equal or greater number of magnets than the number of inductive coil 304a-h of the generator stator 304. Such electrical current may then be stored (e.g., in a capacitor, rechargeable battery, or the like) or used to power the light 50 on the impact tool 100. No outward electrical supply is needed to power the light 50 of the impact tool 100. Instead, the pneumatically driven motor 110 provides the rotational force needed to rotate the generator rotor 306 of magnets 306a-b, thereby inducing electrical current in the inductive coils 304a-h of the generator stator 304.

The generator stator 304 may be in the shape of a circular ring within the motor housing 102, around the longitudinal axis 118. In some embodiments, the magnets 306a-b of the generator rotor 306 are embedded directly in the housing 105 of the rotating impact mechanism 104. In some embodiments, the magnets 306a-b may comprise cylindrical magnets embedded in the housing 105, each magnet having a cylinder axis and each cylinder axis aligned in the housing 105 parallel to the longitudinal axis 118. Alternatively, the magnets 306a-b may be housed in a separate rotor housing that is selectively coupled to and from the impact mechanism 304 by different clutches or friction discs.

The depicted embodiment shows two magnets 306a-b and eight inductive coils 304a-h. This is but one non-limiting example. The generator stator 304 may include any number of inductive coils, and the generator rotor 306 may include any number of magnets. In some embodiments, the electric generator 302 is a three-phase brushless AC generator. Alternative electric generators may also be used and positioned across the motor housing 102 and the impact mechanism 104.

FIG. 4 illustrates a cross-sectional view of the motor housing 102 and the impact mechanism 104, with an electric generator 402 at the back of the motor housing 102 for harvesting electrical power for the light 50. In some embodiments, the electric generator 402 includes: (1) a generator stator 404 that includes a plurality of inductive coils 404a-d, and (2) a generator rotor 406 that includes one or more magnets 406-b. In the illustrated embodiment, the electric stator 404 is positioned on a rear motor shaft 410 at the back of the motor housing 102 (e.g., adjacent to or incorporated into the rear motor endplate 114. Magnets 406a-b of the generator rotor 406 may be attached to or embedded within structure attached to the rear motor shaft 410 or coupled to rear motor shaft 410 by a clutch assembly. In some embodiments, the generator stator 404 and its inductive coils 404a-d are radially positioned around the magnets 406a-b of the generator rotor 406, separated by a radial magnetic air gap 408 perpendicular to the longitudinal axis 118 (referred to herein as the "radial magnetic air gap" 408) between the generator stator 404 and generator rotor 404—or, more specifically, between the inductive coils 404a-d and the magnets 406a-b. In some embodiments the inductor portion may be coupled to or incorporated into the rear end plate 114 of the motor housing 102. In some embodiments the magnet components may be embedded into or coupled to the rear end plate 114 of the motor housing 102 and thus serve as the generator stator while a complimentary rotor assembly of coils may be driven by the motor shaft and may further be coupled to the motor shaft by a clutch assembly.

In operation, rotation of the motor 102 turns the rear motor shaft 410. This, in turn, rotates the magnets 406a-b of the generator rotor 406, thereby inducing electric current in the inductive coils 404a-d of the generator stator 404. Such electrical current may then be stored (e.g., in a capacitor, rechargeable battery, or the like) or used to power the light 50 on the impact tool 100. No outward electrical supply is needed to power the light 50 of the impact tool 100. Instead, the pneumatically driven motor 110 provides the rotational force needed to rotate the generator rotor 406 of magnets 406a-b, thereby inducing electrical current in the inductive coils 404a-d of the generator stator 406.

FIGS. 3 and 4 show that electric generators may be placed in different places within the impact tool 100 and in different configurations to harness the pneumatically driven motor 102. Some embodiments induce electric current across axial magnetic air gaps along longitudinal axis 118 (as shown in FIG. 3), but others induce electric current across radial magnetic air gaps spanning radially outward from the longitudinal axis 118 (as shown in FIG. 4). Also, the illustrated embodiments show magnets in the generator rotors and inductive coils in the generator stators.

Alternative embodiments switch such configurations, using generator rotors with inductive coils and generator stators with the magnets. For example, generator rotor 306 in FIG. 3 may include inductive coils 304a-h, and generator stator 304 may include magnets 306a-b. Or generator rotor 406 in FIG. 4 may include inductive coils 404a-d, and generator stator 404 may include magnets 406a-b. All such configurations are fully contemplated by the disclosed embodiments, providing flexibility as to what is rotated (magnets or coils) and in what direction (axially along axis 118 or radially perpendicular to axis 118).

Figure 5:
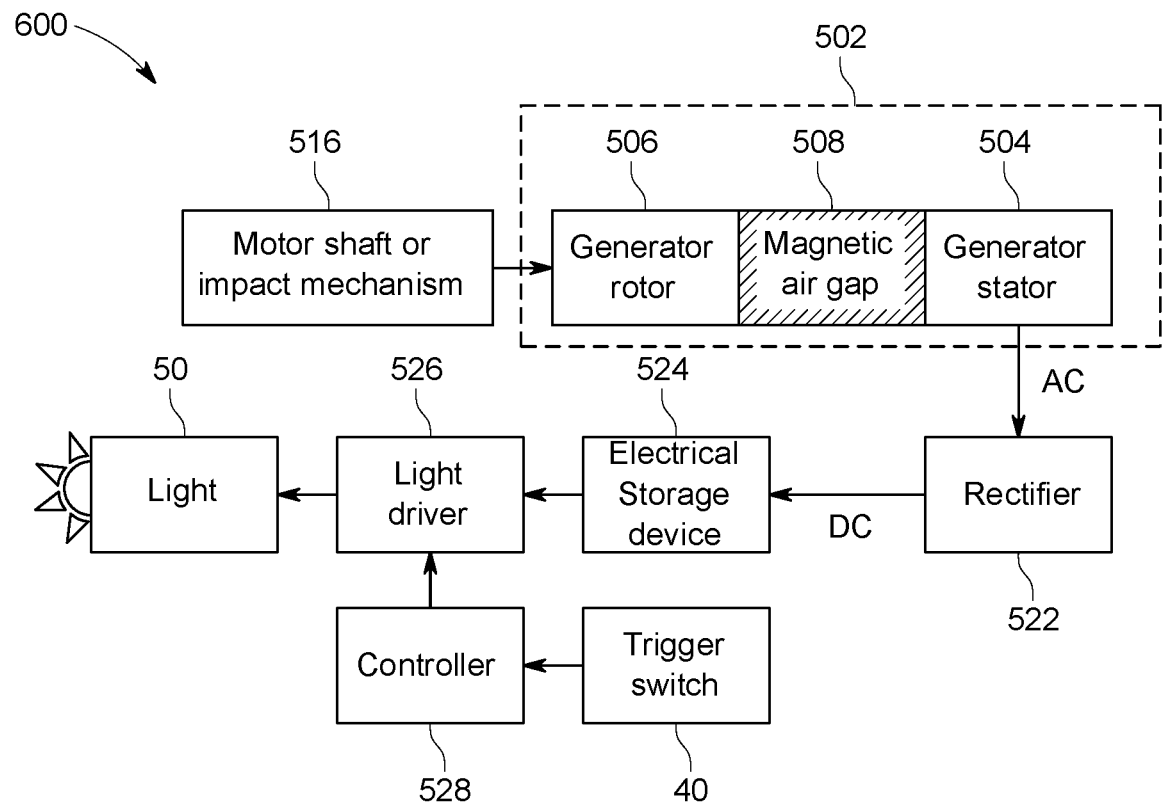
FIGS. 5-6 illustrate a block diagrams of components for harvesting electrical power from internal movement of a pneumatic tool for use in powering an on-board light.

FIG. 5 illustrates a block diagrams of components for harvesting electrical power from internal movement of the impact tool 100. The depicted impact tool 100 includes a motor shaft or impact mechanism 516, a generator rotor 506, a generator stator 504, a magnetic air gap 508, a rectifier 522, an electrical storage device 524, a light driver 526, a controller 528, the trigger switch 40, and the light 50. In reference to the previously discussed embodiments as an example, the motor shaft or impact mechanism 516 may be any rotating portion of the motor 110 or rotating portion of the impact mechanism 104. The generator rotor 506 and the generator stator 508 operate as an electric generator 502 in which electrical power is electromagnetically induced across magnetic air gap 508. In some embodiments, the generator rotor 506 and the generator stator 504 are the generator rotor 306 and the generator stator 304 in FIG. 3. In other embodiments, the generator rotor 506 and the generator stator 504 are the generator rotor 406 and the generator stator 404 in FIG. 4. Similarly, magnetic air gap 508 may be the axial magnetic air gap 308 in FIG. 3 or the radial magnetic air gap 408 in FIG. 4.

With continued reference to FIGS. 2-4, compressed air or gas pneumatically drives motor 110 of the impact tool 100 to rotate the hammers 124 and 126 into contact with the anvil 128, and thereby move the output shaft 70. Rotational force of the motor 110 rotates both the motor shaft 116 used to rotate the impact mechanism 104 as well as the motor drive shaft 116 and the rear motor shaft 410. Regardless of where the generator rotor 506 and the generator stator 504 are positioned (e.g., on the impact mechanism 104, motor drive shaft 116, or rear motor shaft 410), the two electromagnetically induce electrical current across the magnetic air gap 508. For embodiments where the electric generator 502 is the electric generator 302 of FIG. 3 positioned between the motor housing 102 and the impact mechanism 104, rotation of the impact mechanism 104 rotates the generator rotor 306 in relation to the generator stator 304 and induces electric current across the axial magnetic air gap 408. For embodiments where the electric generator 502 is the electric generator 402 of FIG. 4 positioned around the motor housing 102 away from the impact mechanism 104, rotation of the rear motor shaft 410 is used to rotate the generator rotor 406 in relation to the generator stator 404 and induce electric current across the radial magnetic air gap 408.

In some embodiments, the electric generator 502 supplies AC current (or power) to the rectifier 502 for rectification into DC current (or power), e.g., when operating as a three- or multi-phase AC generator. The rectified DC current is stored in the electrical storage device 504. The electrical storage device 504 represents any type of electrical storage component, e.g., a capacitor, super capacitor, rechargeable battery, or the like. In some specific examples, the electrical storage device 504 includes one, two, or more 2.2 F supercapacitors. The electrical power stored in electrical storage device 504 may be selectively used to power the light 50 using the trigger switch 40.

Some embodiments use a controller 508 to sense when the trigger switch 40 is moved to an ON position or sense when a light pull of the trigger switch 40 has occurred. The controller 508 may be an integrated circuit, microcontroller, processor, system on chip (SoC), or programmable logic controller (PLC), or other processing device capable of detecting when the light switch 40 has been switched to the ON position. Alternative embodiments may not use a processing-type controller 508, using, instead, an electrical or mechanical switch that connects the electrical storage device 504 to the light driver 506—or directly to the light 50 in embodiments that do not use a light driver 506—when the user moves the light switch 40 into the ON position.

Figure 7:
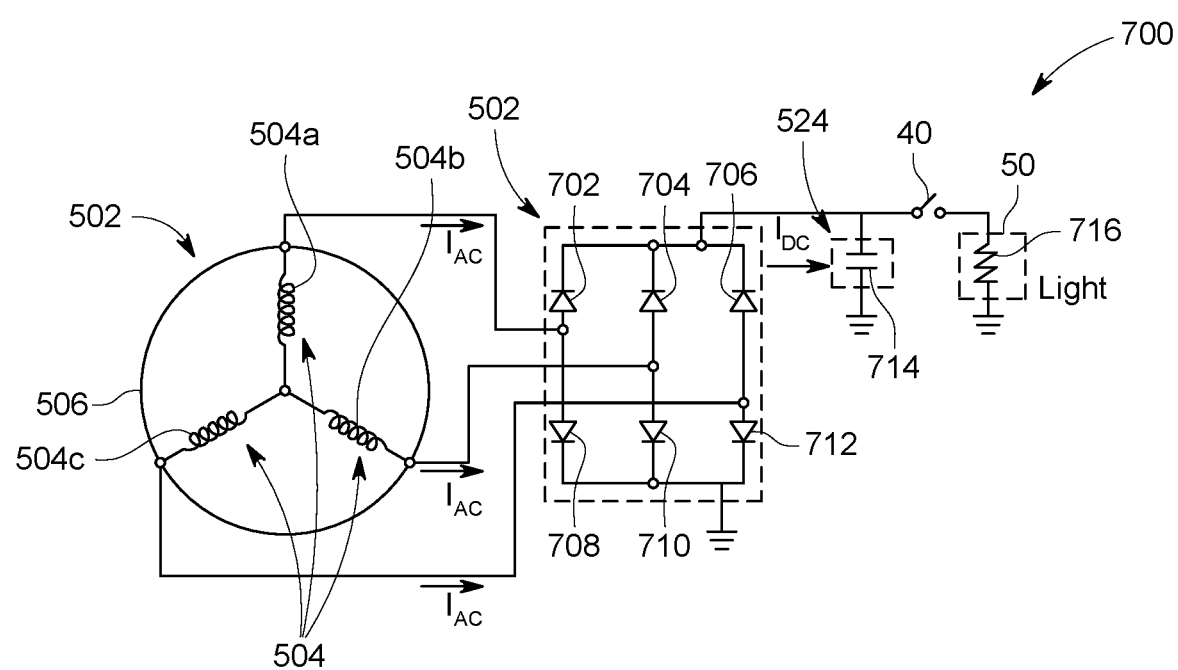
FIG. 7 illustrates a schematic of a circuit for harvesting electrical power from internal movement of a pneumatic tool for use in powering an on-board light.

When the user moves the light switch into the ON position (e.g., through at least a light pull or through a separate switch on the impact tool 100), the light driver 506 of the light 50 is electrically connected to the electrical storage device 504, and the stored electrical power harvested by the electric generator 510 is used to power the light 50. In some embodiments, the light driver 506 is an LED driver that controls the current flowing through the LED of the light 50. In other embodiments, the light driver 506 is an LCD driver that controls the current flowing through the LCD of the light 50. Still other embodiments do not include the light driver 506, and just directly couple the electrical storage device 504 to the light 50 when the light switch 40 is moved to the ON position. Such an embodiment is schematically shown in FIG. 7 and discussed in more detail below.

Figure 6:
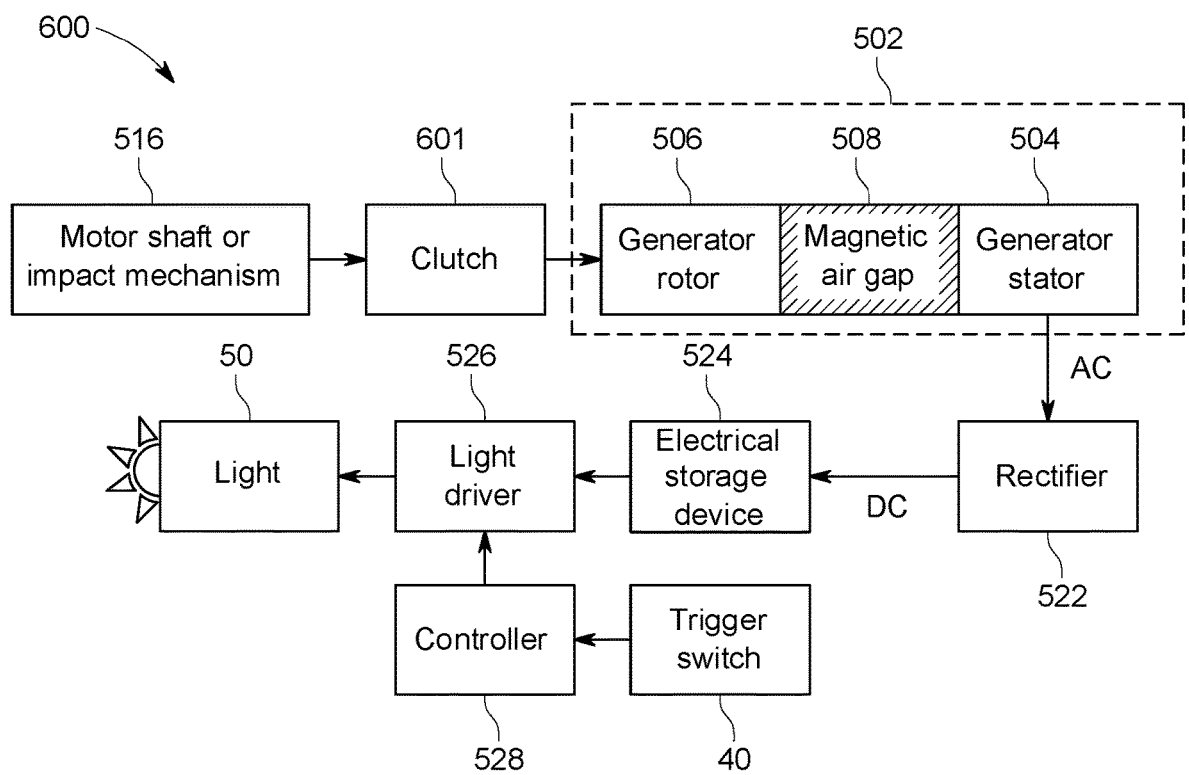

FIG. 6 illustrates a block diagram of the impact tool 100 in FIG. 5 with an added mechanical clutch 601 to selectively engage the generator rotor 506 to the motor shaft or impact mechanism 516. The clutch 601 protects the electric generator 502 from sudden changes in direction of the motor 110 and/or impact mechanism 104, as is common with impact tools when impact is made between the hammers 124/126 and the anvil 128, or when the tools rotate in opposite directions (clockwise to counterclockwise). Sudden changes in direction can be so severe that the generator rotor 506 may not be able to withstand deceleration forces without failure. The clutch 601 is used to protect the generator rotor 506—and thus the electric generator 502—within the impact tool 100. Different types of clutches 601 may be used. Non-limiting examples include, without limitation, centrifugal clutches, plate clutches, hysteresis clutches, cone clutches, or the like. Non-limiting example clutches are shown in FIGS. 11-16 and discussed in detail below.

In some embodiments, the clutch 601 is attached to the motor shaft or impact mechanism 516 and operatively clutches the generator rotor 506 when the motor shaft or impact mechanism 516 spins above a threshold rotational speed and, conversely, releases the generator rotor 506 when the motor shaft or impact mechanism 516 slows down below the threshold rotational speed. For example, the clutch 601 may only grab the generator rotor 506 when the motor shaft or impact mechanism 516 exceeds 2000 RPM and releases the generator rotor 506 when such rotation falls that threshold. When released, the generator rotor 506 is allowed to slow down on its own in the direction it is spinning.

Additionally or alternatively, a "friction disc" may be used to rotate and release the generator rotor 506. As referenced herein, a friction disc is a washer-like disc that is rotated by an "engagement rod" fast enough to hold the generator rotor 506 in place using friction. Examples of friction discs and engagement rods shown in FIGS. 8A-10 and discussed in more detail below.

FIG. 7 illustrates a schematic view of an electrical circuit 700 for powering the light 50 on the impact tool 100 using rotational movement of the pneumatically driven motor 110. With continued reference to FIGS. 5-6, the circuit 700 shows the electric generator 502, the rectifier 522, the energy storage device 524, the trigger switch 40, and the light 50. As shown, the electric generator 502 is a three-phase AC generator consisting of the generator stator 504 and the generator rotor 506. In operation, the motor shaft or impact mechanism 516 is rotated inside the impact tool 100 by a supply of compressed air/gas, and the electric rotor 506, in turn, rotates, thereby inducing AC current (or power) in the inductive coils 504a-c of the generator stator 504.

In some embodiments, the inductive coils 504a-c of the generator stator 504 are connected to the rectifier 502. In some embodiments, the rectifier 502 rectifies AC current ($I_{AC}$) from the inductive coils 504a-c to DC current ($I_{DC}$) that can be used to power the light 50. In one embodiment, the rectifier 502 comprises pairs of opposite facing diodes 702-712 connected in parallel with each other. Each of the inductive coils of the generator stator 504 are connected in between a pair of opposite-facing diodes 702-712. For instance, a first pair of diodes 702 and 708 is connected to a first inductive coil 504a. A second pair of diodes 704 and 710 is connected to a second inductive coil 504b. And a third pair of diodes 706 and 712 is connected to a third inductive coil 504c. Using a three-phase generator makes the electric current generated by the inductive coils 504a-c out of phase with each other by 60°. The pairs of diodes 702-712 rectify these out of phase AC currents and producing constant $I_{DC}$ for storage in the energy storage device 524. In some embodiments, as shown in FIG. 7, the energy storage device 524 is a capacitor 714. For example, the energy storage device 524 may be one or more 2.2 F supercapacitors. In other embodiments, the energy storage device 524 is a rechargeable battery.

Stored DC current $I_{DC}$ may then be used to power the light when the user elects to turn ON the light 50 (shown as load resistance 716) using the trigger switch 40. In some embodiment, moving the triggering switch to the ON mode closes an electrical (e.g., transistor) or mechanical switch between the energy storage device 524 and the light 50, thereby supplying stored DC current $I_{DC}$ to the light 50, or the light driver 526 controlling the light 50. In other embodiments, moving the trigger switch 40 to the ON position electrically signals the controller 528 (e.g., processor, controller, PLC, SoC, or other electrical component) to close switch and supply the stored DC current $I_{DC}$ to the light 50, or the light driver 526 controlling the light 50. In such an embodiment, the stored DC current $I_{DC}$ may also be used to power the controller 528 as well.

Figure 8:
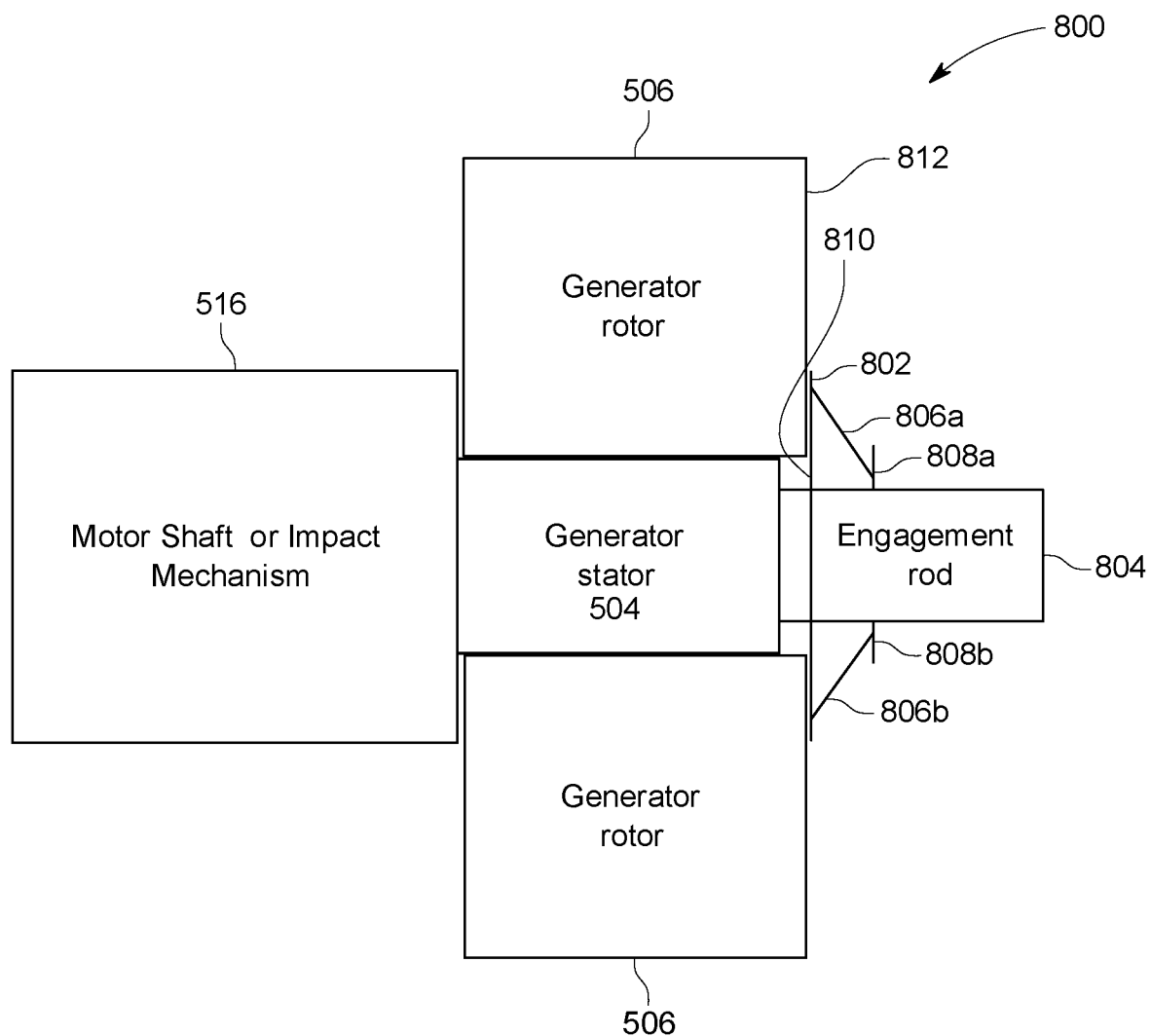
FIG. 8 illustrates a block diagram of a pneumatic tool with a friction disc to selectively engage and disengage a rotor of an electric generator to a rotating engagement rod.

FIG. 8 illustrates a block diagram of an electric generator that is selectively coupled to a rotating motor of an impact tool using a friction clutch assembly 800 ("friction clutch" 800) which may comprise a friction disc 802. The friction disc 802 is a disc with a center hold for receiving an engagement rod 804. The engagement rod 804 is a shaft that is rotated by the motor shaft or impact mechanism 516 of the impact tool 100. In some embodiments, the engagement rod 802 passes through the generator stator 504, or put another way, the generator stator 504 radially extends around the engagement rod 804. One or more springs, such as a Belleville (coned) spring 806, press a friction face 810 of friction disc 802 against a hub face 812 of generator rotor 506. The one or more springs may be retained in position on engagement rod 804 by one or more retaining clips 808.

Figure 9:
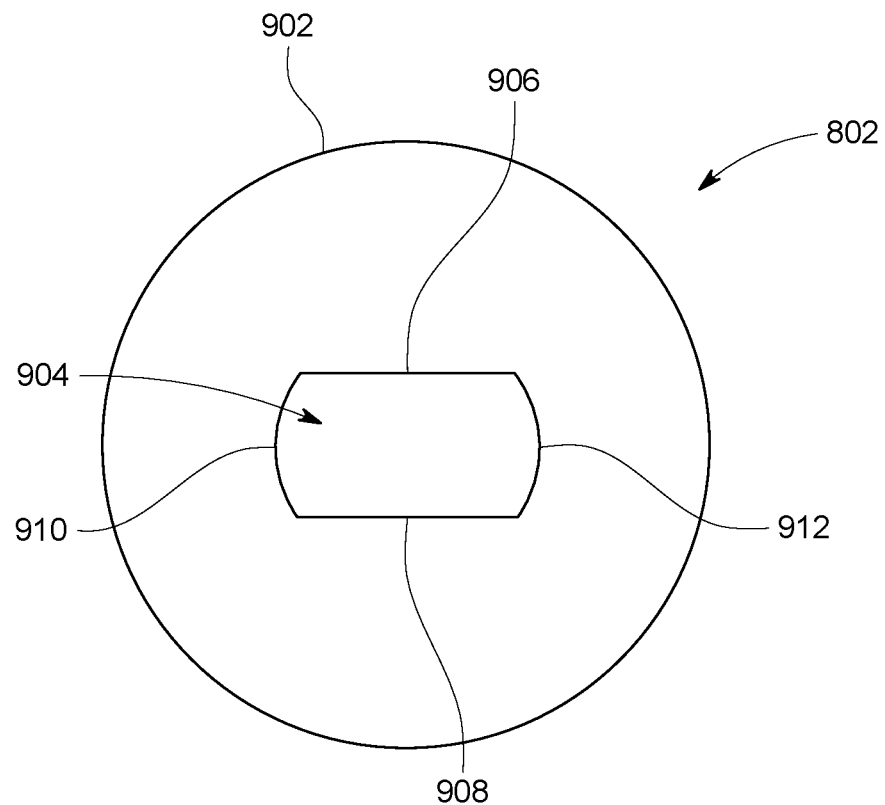
FIG. 9 illustrates a friction disc to selectively engage and disengage a rotor of an electric generator to a rotating engagement rod.
Figure 10:
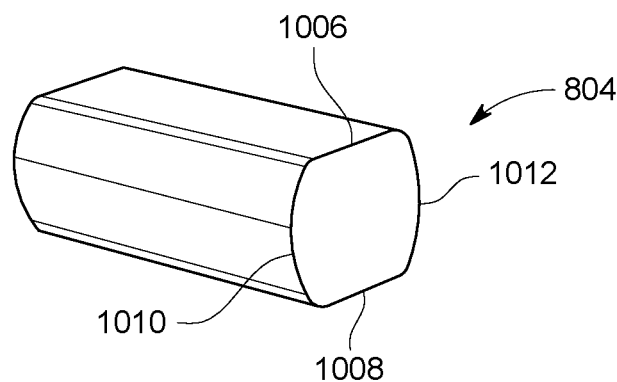
FIG. 10 illustrates an engagement rod for rotating a friction disc.

FIG. 9 shows an embodiment of the friction disc 802, which has a circular outer edge 902 and an opening 904 shaped to receive the engagement rod 804. For example, the inner profile 904 may be shaped in the illustrated "double D" profile, matching a similar outer profile of the engagement rod 804 shown in FIG. 10. More specifically, the inner profile may be shaped with parallel walls 906 and 908 facing each other and convex walls 912 and 912 facing each other. Looking at FIG. 10, one embodiment of the engagement rod 804 fits the opening 904 of the friction disc 802, with a double D profile formed by facing parallel walls 1006 and 1008 facing each other and convex walls 1006 and 1008 facing each other. The friction disc 802 may slide onto the engagement rod 804, and the double D profile allows the friction disc 802 to rotate with the engagement rod 804.

The friction face 802 of the friction disc 802 is biased against the hub face 812 of the generator rotor 506 and, by way of friction between friction face 810 and the hub face 812 of the generator rotor 506, imparts indirect rotational movement to the generator rotor 506 when the engagement rod 804 rotates. The friction clutch 800 smooths any differences in rotational speeds of the engagement rod 804 and the generator rotor 506. Accordingly, if operation of the power tool 100 by way of rotation of the engagement rod 804 has induced rotation of the generator rotor 506 and then rotation of the engagement rod is suddenly stopped or reversed (as may occur in hammer strikes), the friction clutch 800 separates the generator rotor 506 from the shock of the sudden stop or reversal of the engagement rod 804 rotation, thus protecting the generator rotor 506 from shock or other damage. At a sudden stoppage or reversal of engagement rod 804 rotation, the generator rotor may safely spin down under the friction effect of the friction disc 802 against the generator hub As previously mentioned, various clutches may be used to selectively engage and disengage the generator rotors mentioned herein to the pneumatically driven motors and impact mechanisms of the impact tools. Several different types of clutches are shown in FIGS. 11-16, which are discussed below. These examples are non-limiting, and other clutches and clutch types may alternatively be used.

Figure 11:
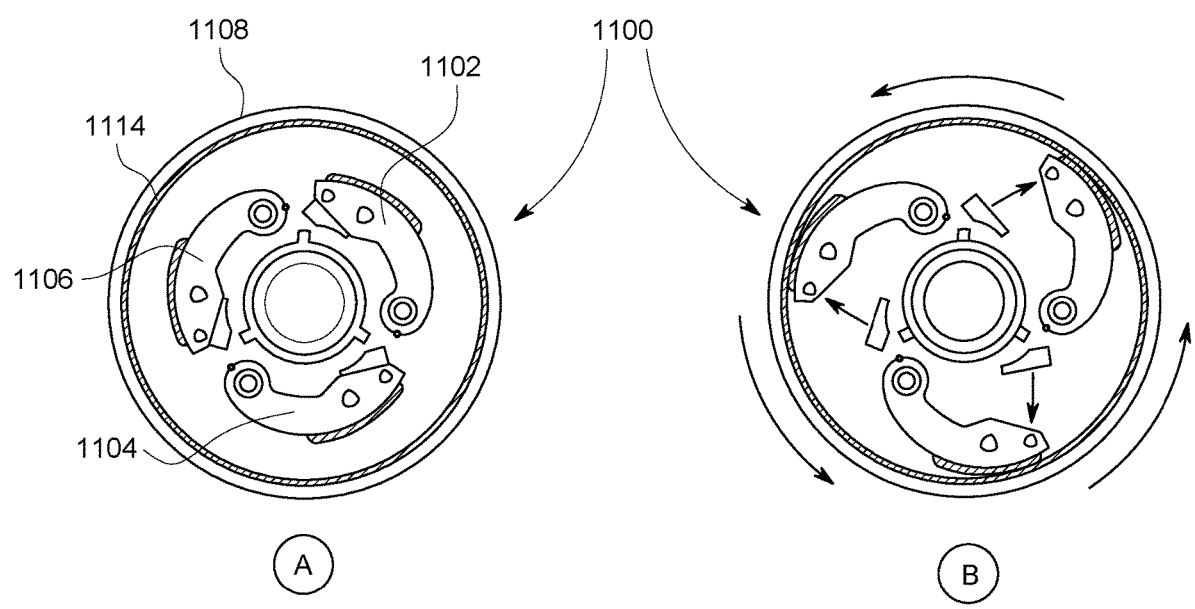
FIGS. 11-13 illustrate centrifugal clutches for use in engaging a generator rotor to rotating components of a pneumatic tool.

FIG. 11 illustrates a centrifugal clutch 1100 with three pivoting shoes 1102, 1104, and 1106. The centrifugal clutch 1100 has an outer drum 1108 that may be connected to the generator rotors mentioned herein. A rotatable inner driving shaft 1110 that may be connected to the motor drive shafts and impact mechanisms of an impact tool. The pivoting shoes 1102, 1104, and 1106 are externally lined with a high-friction material or protrusions capable of frictionally gripping an internal lining 1114 of high-friction material or protrusions inside of the outer drum 1108.

Two instances of the centrifugal clutch 1100 are shown in FIG. 11. Time A shows the centrifugal clutch 1100 when rotational speed is not large enough to move the pivoting shoes 1102-1106, and thus the shoes 1102-1106 stay in a disengaged position. Time B shows the centrifugal clutch 1100 when rotational speed is large enough to outwardly rotate the pivoting shoes 1102-1106 into contact with the outer drum 1108. The depicted arrows at time B represent that the clockwise movement of the centrifugal clutch 1100 is large enough to generate centrifugal forces that move the pivoting shoes out and into contact with the inner lining. Such a clutch 1100 may be used to engage the generator rotors discussed herein.

Figure 12:
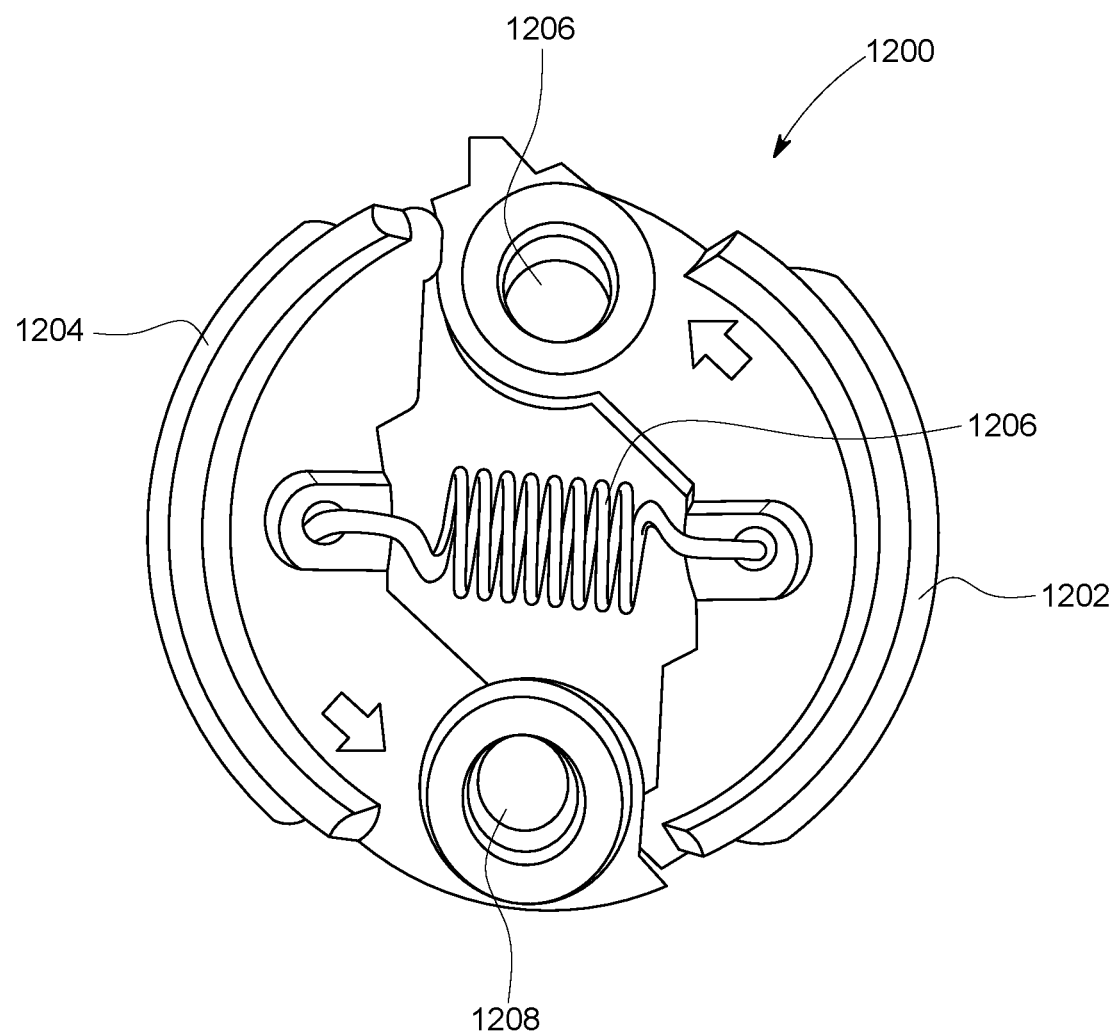

FIG. 12 illustrates a centrifugal clutch 1200 with two wings 1202 and 1204 connected by a spring 1206. In operation, rotation of the centrifugal clutch 1200 expands the spring 1206 forcing the wings 1202 and 1204 radially outward until they contact a generator rotor—or a clutch drum connected to a generator rotor. The centrifugal clutch 1200 may be connected to a rotating motor shaft or impact mechanism using holes 1206 and 1208, and the wings 1202-1204 may expand to clutch the generator rotors discussed herein.

Figure 13:
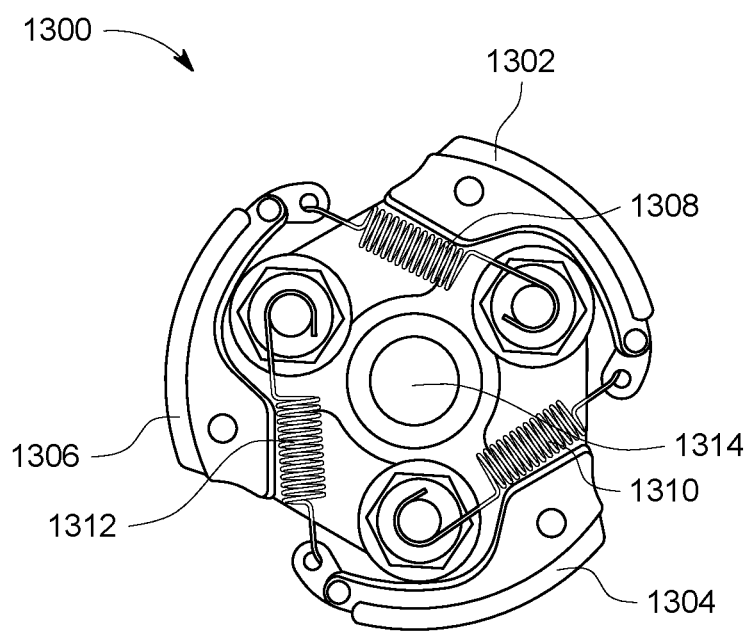

FIG. 13 illustrates a centrifugal clutch 1300 with three wings 1302, 1304, and 1306 connected by springs 1308, 1310, and 1312, respectively. In operation, rotation of the centrifugal clutch 1300 expands the springs 1308, 1310, and 1312 forcing the wings 1302, 1304, and 1306, respectively, radially outward until they contact a generator rotor—or a clutch drum connected to a generator rotor. The centrifugal clutch 1300 may be connected to a rotating motor shaft or impact mechanism using hole 1314.

Embodiments are not limited to two- and three-winged or—armed centrifugal clutches. Any number of moving wings or pivoting arms may be used.

Figure 14A:
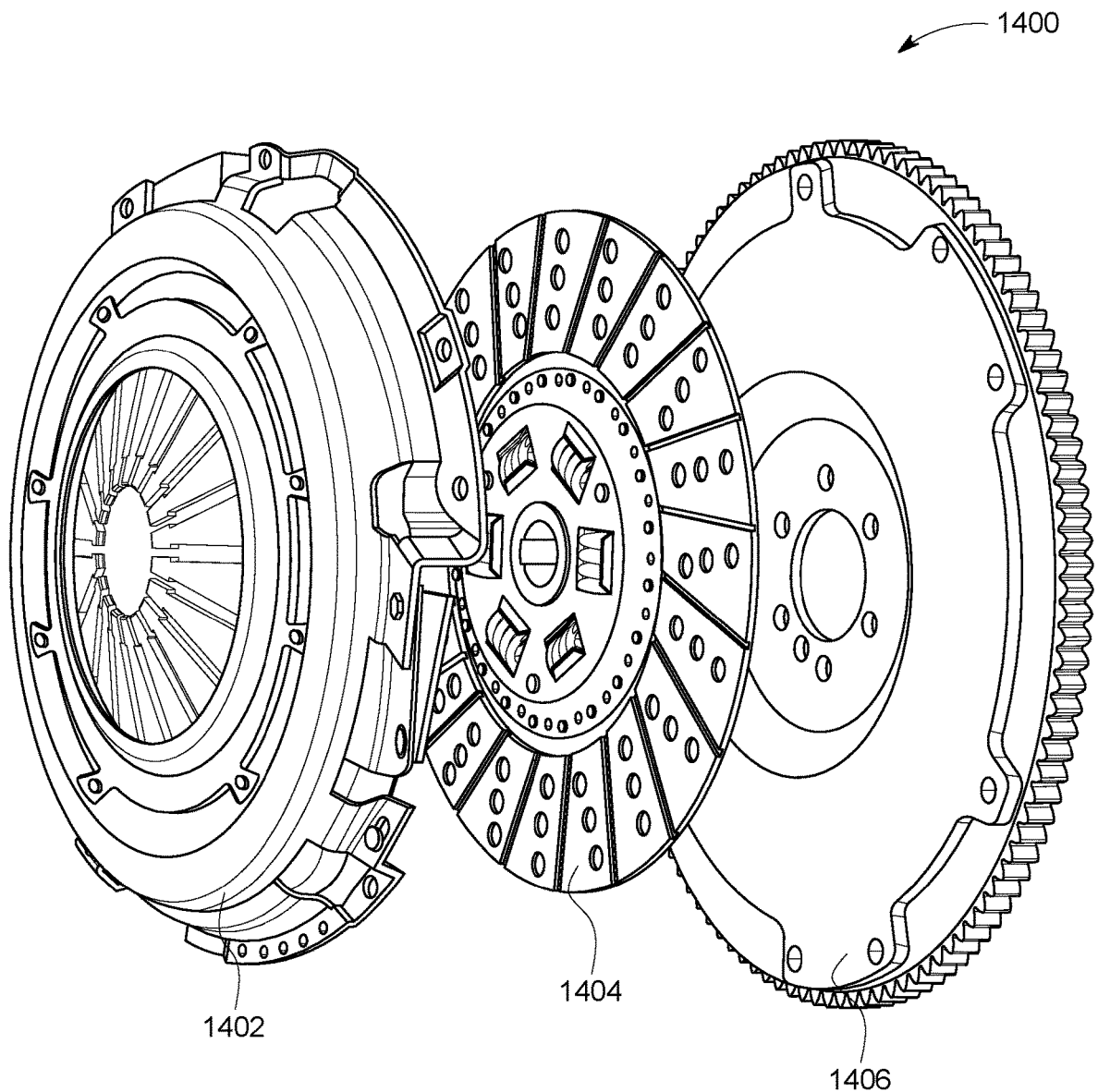
FIGS. 14A-14B illustrate a perspective view and a cross-sectional view, respectively, of a plate clutch for use in engaging a generator rotor to rotating components of a pneumatic tool.
Figure 14B:
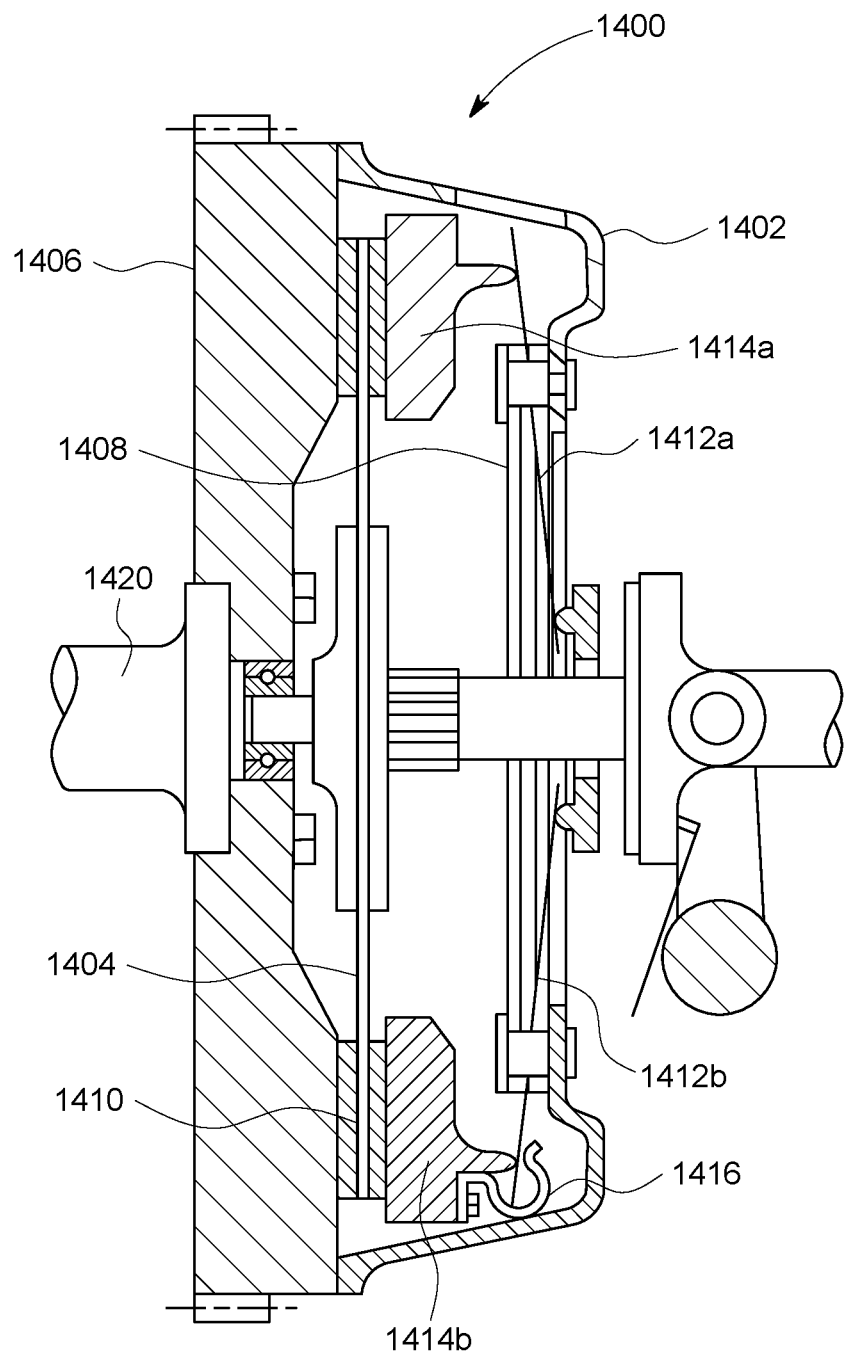

FIGS. 14A-14B illustrate perspective and cross-sectional views, respectively, of a plate clutch 1400. The plate clutch includes a clutch cover 1402, a center plate 1404, and a flywheel 1406. Additionally, as shown in FIG. 14B, the plate clutch 1400 includes fulcrum rings 1408, friction liners 1410, diaphragm spring 1412a-b, pressure plate 1414a-b, and a retractable spring 1416. Operationally, in some embodiments, the plate clutch 1400 is designed with a preload pressure force such that the pressure plates 1414a-b transmit enough torque to maintain engagement when the motor is running, yet provide enough slippage when impact occurs and the motor rapidly decelerates.

Figure 15:
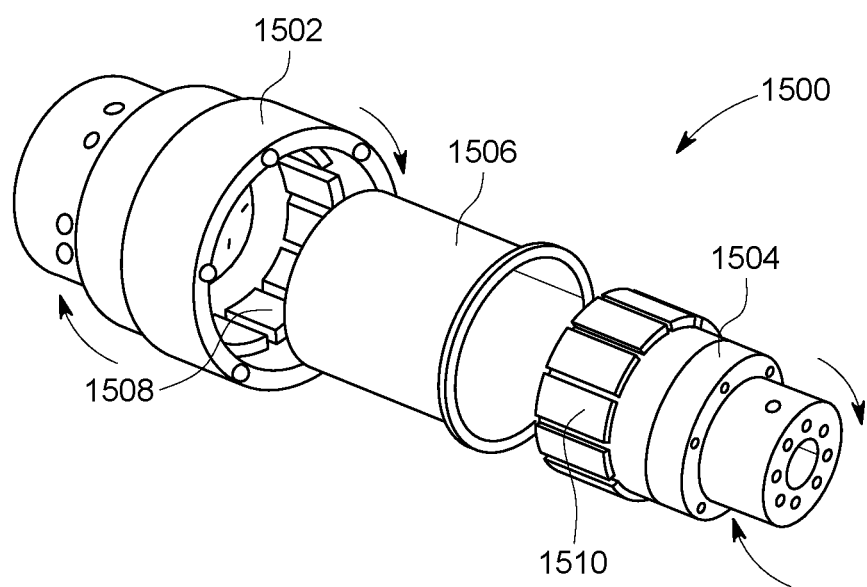
FIG. 15 illustrates a perspective view of a hysteresis clutch for use in engaging a generator rotor to rotating components of a pneumatic tool.

FIG. 15 illustrates a perspective view of hysteresis clutch 1500 that uses magnets to the limit the torque applied from an external coupling 1502 to an internal coupling 1504. The external coupling 1502 and the internal coupling 1504 are separated by a containment shroud 1506. Internal magnets 1508 are radially positioned around an inner diameter of the external coupling 1502, and external magnets 1510 are radially positioned around an outer diameter of the internal coupling 1504. In some embodiments, the external coupling 1502 is attached to the rotating motor shafts or impact mechanisms of the pneumatically driven impact tool discussed herein, and the internal coupling is attached to the disclosed generator rotors.

Figure 16:
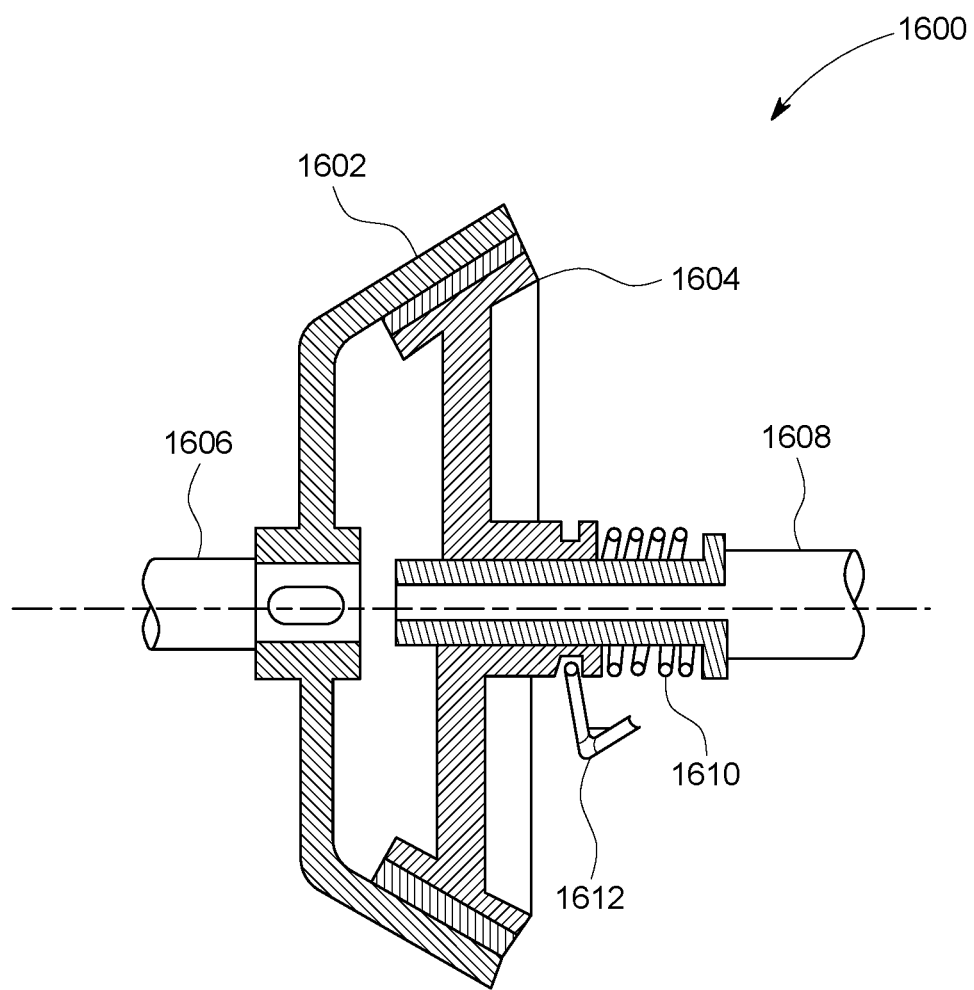
FIG. 16 illustrates a cross-sectional view of a cone clutch for use in engaging a generator rotor to rotating components of a pneumatic tool.

FIG. 16 illustrates a cone clutch 1600 that includes an outer cone 1602, an inner cone 1604, a driving shaft 1606, a driven shaft 1608, an actuating spring 1610. In some embodiments, the disclosed rotating motor shafts or impact mechanisms are coupled to the driving shaft 1606 and rotate the outer cone 1602. Rotation of the outer cone 1602, in turn, causes the internal cone to move away from the driving shaft. Operationally, in some embodiments, the cone clutch 1600 is designed with a preload pressure force that allows the cone-shaped clutch elements to transmit enough torque to maintain engagement when the motor is running but provide slippage when impact occurs and the motor rapidly decelerates.

Figure 17A:
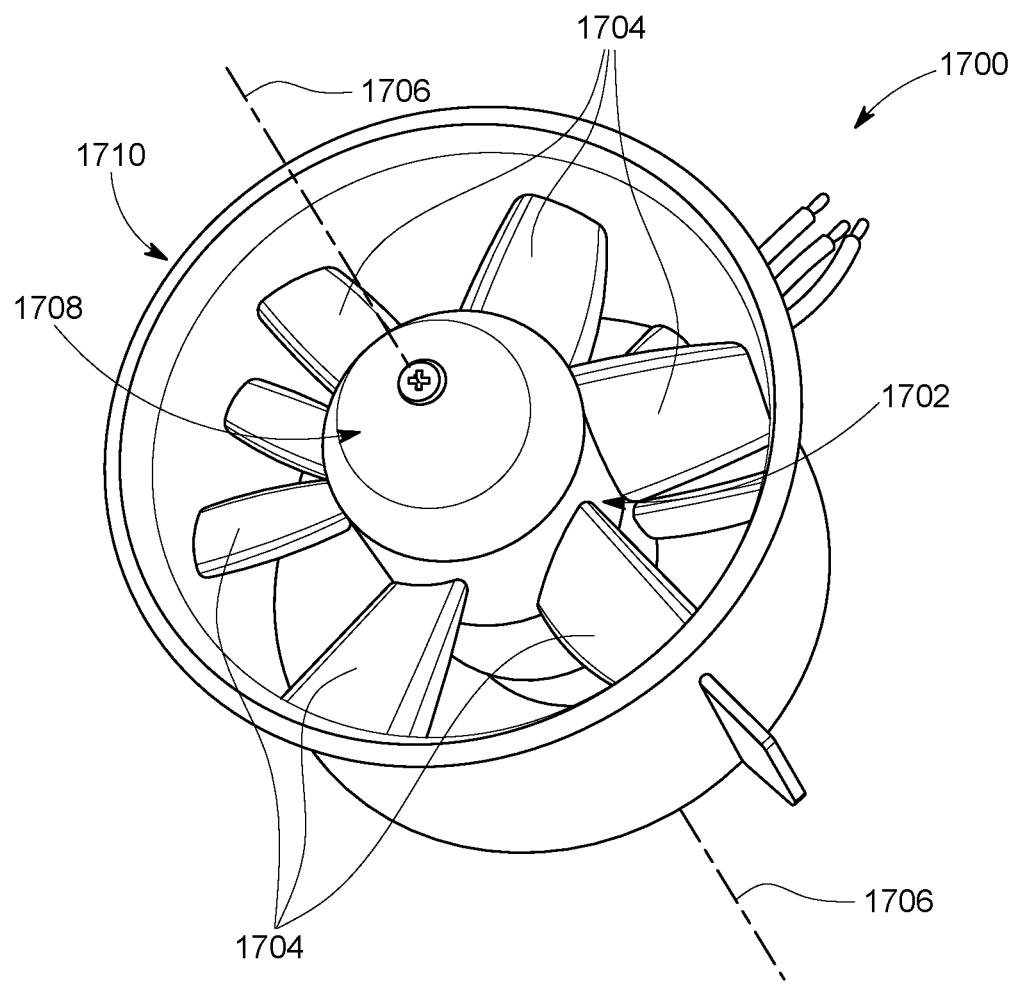
FIG. 17A illustrates a perspective view of an axial flow turbine electric generator that may be used in some embodiments to generate electrical power.

FIG. 17A illustrates a perspective view of an axial flow turbine electric generator 1700 (simply "axial generator" 1700) that may be used in some embodiments. The axial generator 1700 includes a rotor 1702 comprising one or more fan blades 1704 that are angled relative to a central axis 1706 passing through the center of a central hub 1708 of the axial generator 1700. In operation, pneumatic air or gas is axially supplied to the axial generator 1700 along the central axis 1706 to rotate the fan blades 1704 around the central hub 1708. A generator stator may be positioned inside of the hub 1708 or outside in an outer ring 1710. Magnets and inductive coils may be placed either on the rotor 1702 or the stator to induce electrical power from movement of the rotor 1702. Thus, the axial generator 1700 harnesses air/gas traveling along central axis 1706 to rotate the rotor 1702, and thereby generate electrical power.

Figure 17B:
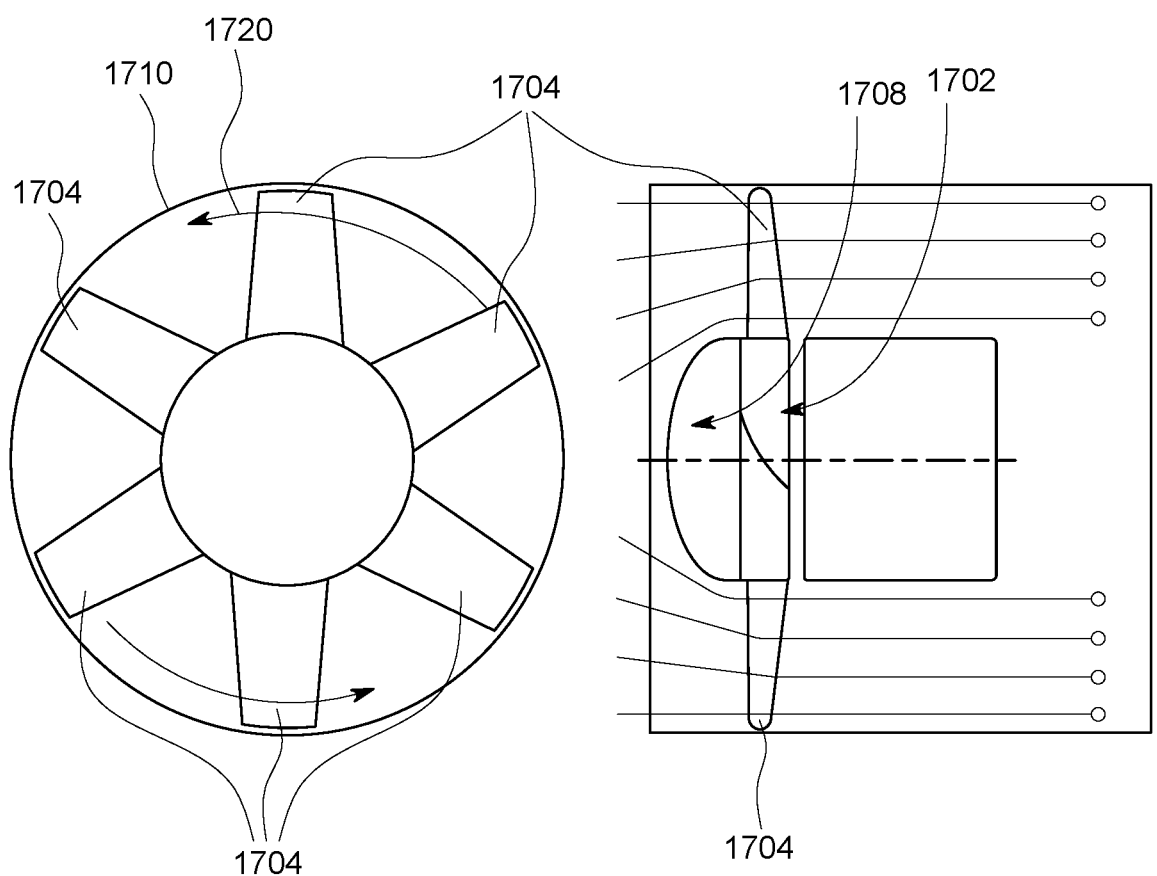
FIG. 17B illustrates the axial generator rotating.

FIG. 17B illustrates the axial generator 1700 being rotatable from supplied pneumatic air or gas pushing against the fan blades 1704. In some embodiments, the exhaust air/gas that was supplied to rotate the motor of the impact tool 100 is directed tot the axial generator 17B for electrical power generation before being directed out of the impact tool 100. As shown in the rightmost view of FIG. 17B, supplied pneumatic air/gas bends around the stator 1708 and comes into contact with the fan blades 1704 of the rotor 1702. The angled fan blades 1704 catch the supplied air/gas and rotate the rotor 1702 in a counterclockwise direction 1720. The axial generator 1700 may alternatively be configured to rotate clockwise.

Figure 18:
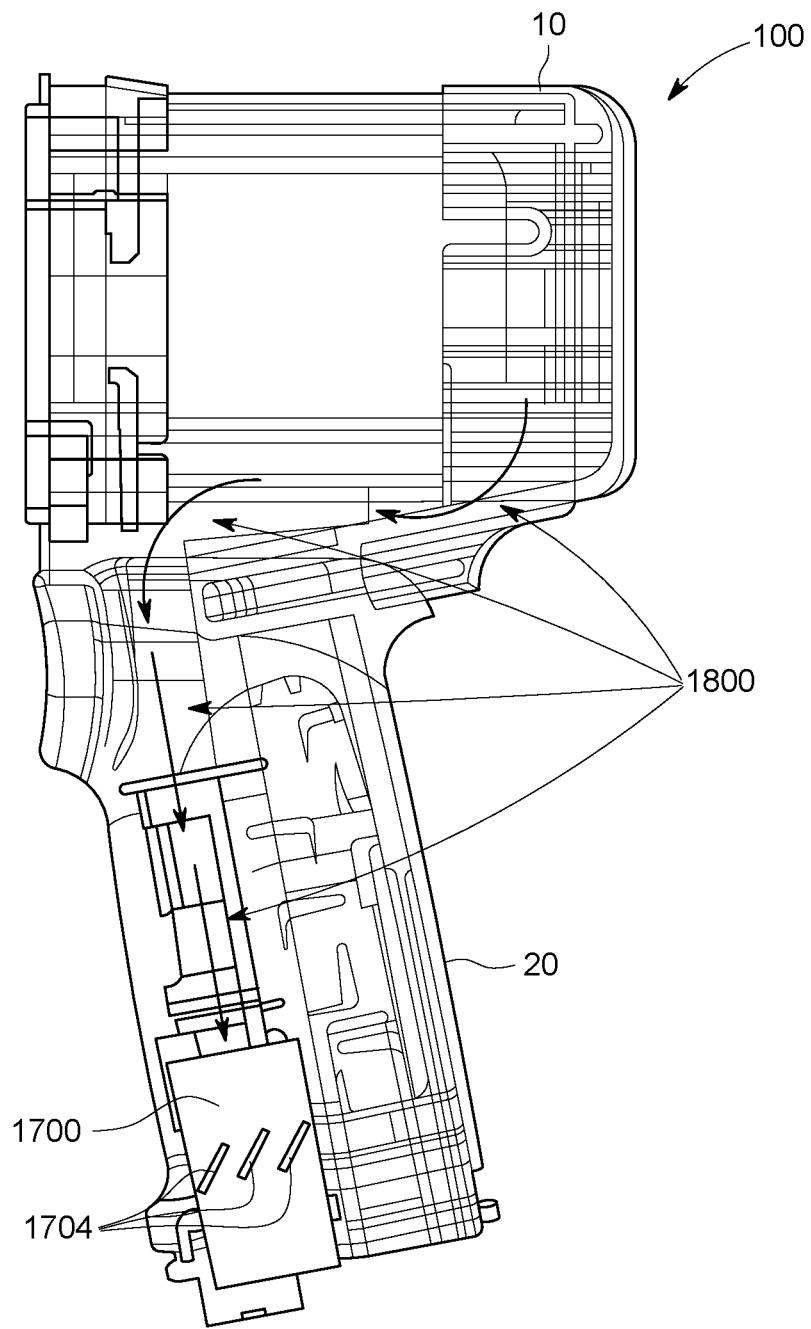
FIG. 18 illustrates a partial cross-sectional view of an impact tool with the axial generator positioned in the handle.

FIG. 18 illustrates a partial cross-sectional view of the impact tool 100 with the axial generator 1700 positioned in the handle 20. The axial generator 1700 receives the air/gas that has already been rotated the motor of the impact tool and that is being directed out through the handle 20. Arrows 1800 illustrate the pathway for the exhaust air/gas to travel, being recycled to the back end of the upper portion 10 and down through the handle 20 toward the axial generator 1700 before exiting. In the handle 20, the exhaust air/gas rotates the fan blades 1704 of the axial generator 1700 to generate electrical power that may be used to power the previously discussed light 50 on the impact tool 100.

Figure 19:
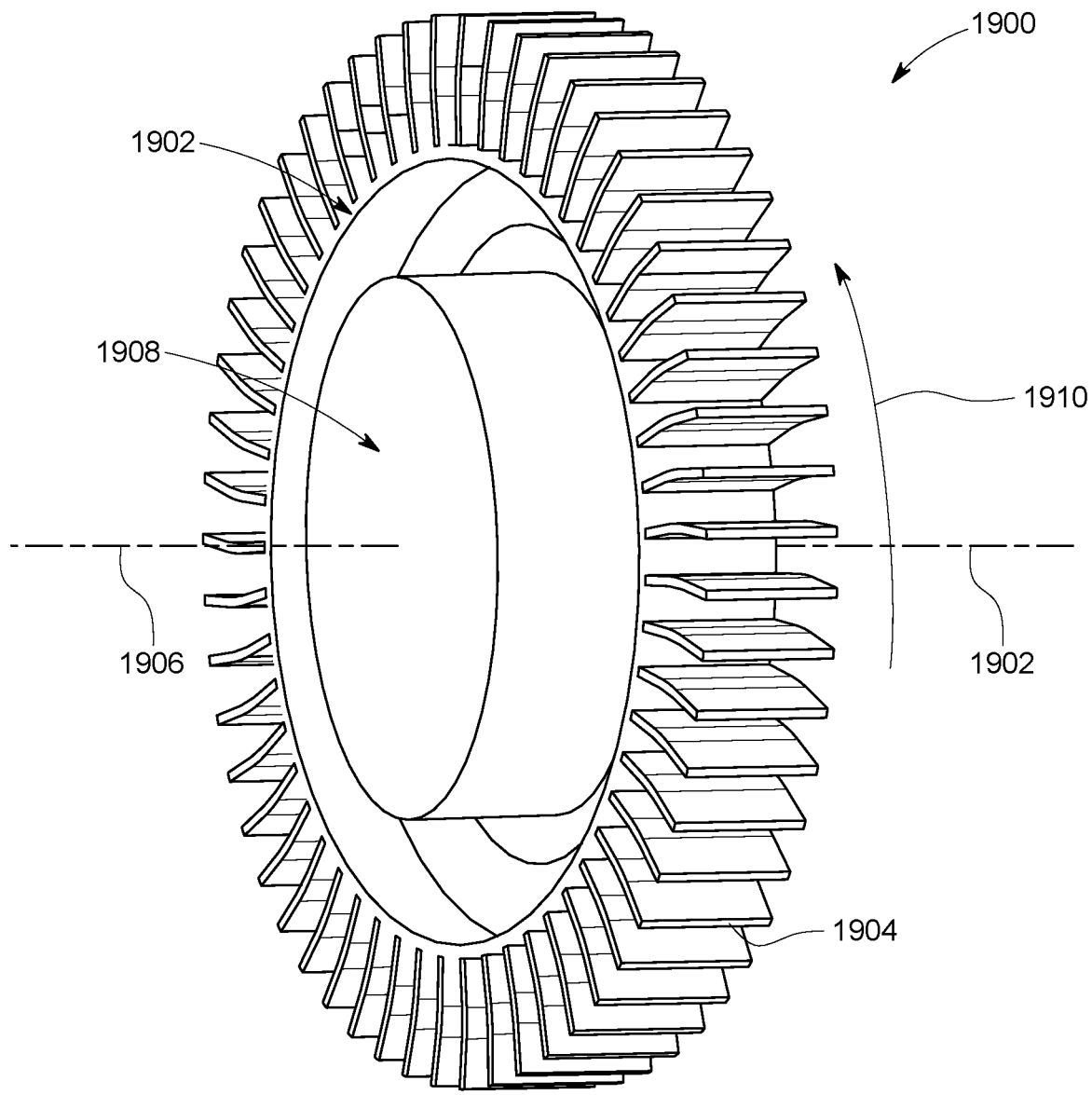
FIG. 19 illustrates a perspective view of a tangential flow turbine electric generator that may be used in some embodiments to generate electrical power.

FIG. 19 illustrates a perspective view of a tangential flow turbine electric generator 1900 (simply "tangential generator" 1900) that may be used in some embodiments. The tangential generator 1900 includes a rotor 1902 comprising one or more fan blades 1904 that are parallel to a central axis 1906 passing through the center of a central hub 1908. In operation, pneumatic air or gas is tangentially—relative to the central axis 1906—supplied to the axial generator 1900 in the direction shown by arrow 1910. This tangential flow of air/gas pushes the fan blades 1904 and thereby rotates the rotor 1902 around the central hub 1908. A generator stator may be positioned inside of the central hub 1908 or along an outer ring (not shown) radially outside of the fan blades 1904. Magnets and inductive coils may be placed either on the rotor 1902 or the stator to induce electrical power from movement of the rotor 1902. Thus, the tangential generator 1900 harnesses air/gas traveling tangential to the central axis 1906 to rotate the rotor 1902, and thereby generate electrical power.

Figure 20:
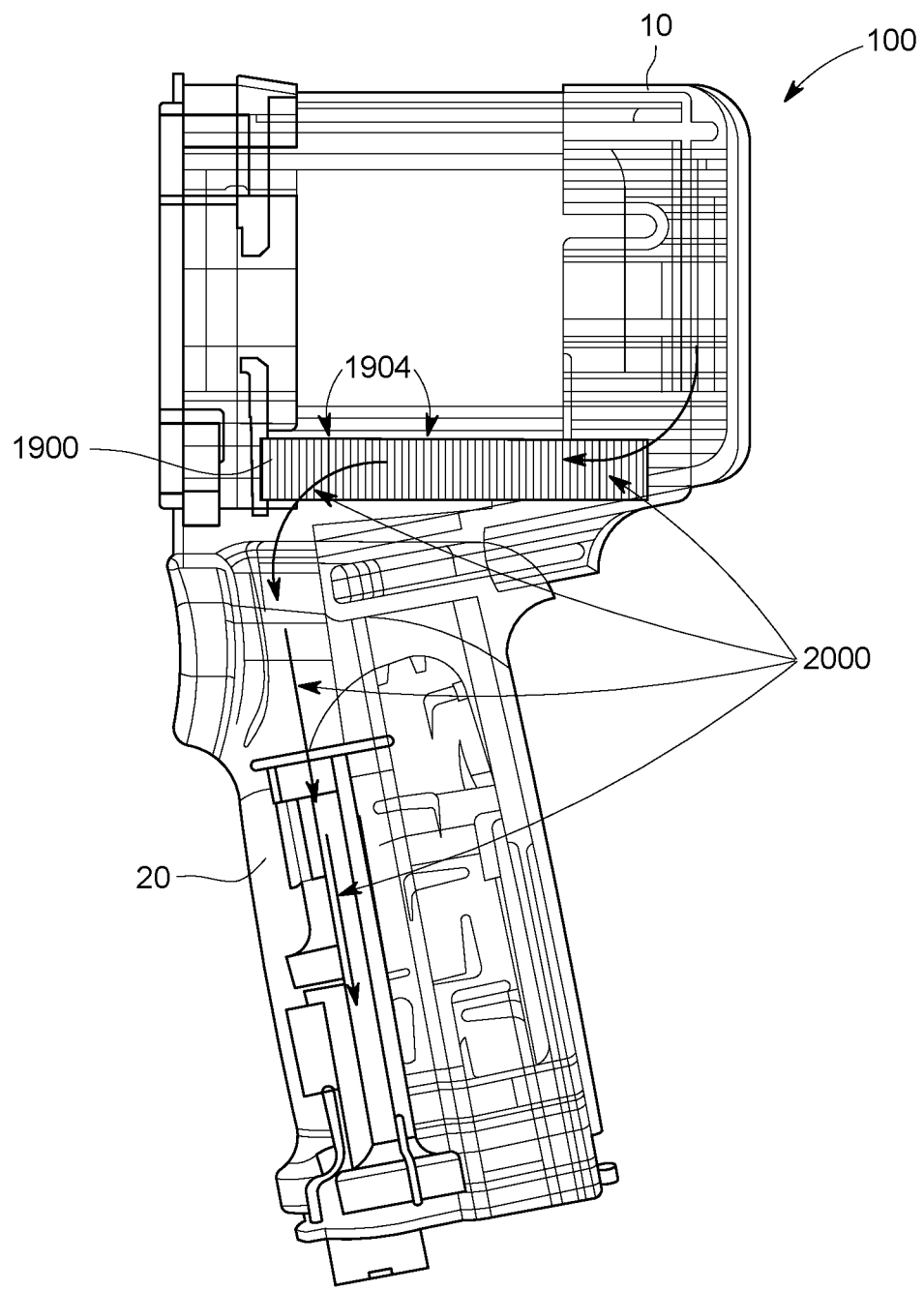
FIG. 20 illustrates a partial cross-sectional view of an impact tool with the tangential generator positioned in the upper portion to use exhaust air/gas to generate electrical power.

FIG. 20 illustrates a partial cross-sectional view of the impact tool 100 with the tangential generator 1900 positioned in the upper portion 10 to use exhaust air/gas to generate electrical power. In some embodiments, the tangential generator 1900 receives exhaust air/gas that has already driven the motor of the impact tool and that is being directed out of the impact tool 100 through the handle 20, as illustrated by arrows 2000. The so-directed exhaust air/gas rotates the fan blades 1904 of the tangential generator 1900 to generate electrical power that may be used to power the previously discussed light 50 on the impact tool 100.

Additional Examples

Some example are directed to an impact tool that is pneumatically driven by compressed air or gas, and not by electrical power. The impact tool includes: a pneumatically driven motor configured to rotate from the compressed air or gas and drive rotation of an output shaft; an electric generator configured to generate electrical power from rotation of the pneumatically driven motor being driven by the compressed air or gas; and a light configured to be electrically powered using the electrical power generated by the electric generator.

In some examples, the impact mechanism is coupled to the motor or the motor housing. And the impact mechanism includes one or more hammers and an anvil. The impact mechanism is also configured to be rotated by the pneumatically driven motor.

In some examples, electric generator includes: a generator stator coupled to the motor housing and including one or more inductive coils, and a generator rotor coupled to the impact mechanism and comprising one or more magnets to be rotated relative to the generator stator for inducing the electrical power in the inductive coils. Rotation of the impact mechanism driven by the pneumatically driven motor causes the generation rotor to rotate and electromagnetically induce the generated electrical power in the generator stator.

Some examples include an energy storage device configured to electrically store the generated electrical power.

In some examples, the energy storage device is at least one of a capacitor or a rechargeable battery.

Some examples also include: a trigger switch that may selectively be actuated by a user to rotate the pneumatically driven motor using the received compressed air or gas and electrically power the light using the electrical power generated by the electric generator.

In some examples, the trigger switch is configured to turn the light on using the generated electrical power through a partial pull the trigger switch, without rotating the output shaft.

In some examples, the electric generator is a three-phase brushless generator.

Some examples include a rectifier configured to rectify the generated electrical power from AC current (or power) to DC current (or power) before being supplied to the light.

Some examples include: an energy storage device configured to electrically store the generated electrical power for later supply to the light; a trigger switch for a user to selectively turn on the light; and a controller configured to supply the generated electrical power to the light in response to the trigger switch being actuated.

In some examples, the light comprises an LED or LCD ring. Either may be positioned around the output shaft.

In some examples, the pneumatically driven motor is not powered by electrical power.

Some examples are directed to an impact tool that is pneumatically driven by compressed air or gas to move an output shaft that includes: a pneumatically driven motor configured to rotate from the compressed air or gas; an impact mechanism configured to be rotated by the motor and consequently rotate the output shaft; an electric generator configured to generate electrical power from rotation of the motor or the impact mechanism; and a light configured to be electrically powered using the electrical power generated by the electric generator.

Some examples also include a motor housing that houses the pneumatically driven motor. And the electric generator includes: a generator rotor comprising one or more magnets coupled to the impact mechanism, and a generator stator comprising one or more inductive coils coupled to the motor housing.

Some examples also include a rear motor shaft that is rotated by the pneumatically driven motor, the rear motor shaft facing away from the impact mechanism. And the electric generator includes: a generator rotor comprising one or more magnets coupled to the rear motor shaft, and a generator stator radially surrounding the rear motor shaft and the one or more magnets.

Some examples include an energy storage device configured to store the generated electrical power.

Some examples are directed to an impact tool that is pneumatically driven by compressed air or gas to move an output shaft that includes: a pneumatically driven motor configured to rotate from the compressed air or gas; an impact mechanism configured to be rotated by the motor and consequently rotate the output shaft; an electric generator configured to generate electrical power from rotation of the motor or the impact mechanism, the electric generator comprising a generator rotor and a generator stator; a clutch to engage and disengage the generator rotor to the impact mechanism or the pneumatically driven motor; and a light configured to be electrically powered using the electrical power generated by the electric generator.

In some examples, the generator rotor and the generator stator define a magnetic impact gap therebetween axially along a longitudinal axis through the impact mechanism and the output shaft or radially perpendicular to the longitudinal axis through the impact mechanism and the output shaft.

In some examples, the generator rotor includes magnets that are embedded in the impact mechanism.

In some examples, the clutch comprises at least one of a centrifugal clutch, a plate clutch, or a cone clutch.

The above Additional Examples may be combined in any feasible way to create alternative examples and embodiments to those disclosed herein.

It is to be understood that the above description is intended to be illustrative, and not restrictive. For example, the above-described embodiments (and/or aspects thereof) may be used in combination with each other. Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Further, each independent feature or component of any given assembly may constitute an additional embodiment. In addition, many modifications may be made to adapt a particular situation or material to the teachings of the disclosure without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the disclosure should, therefore, be determined with reference to the appended claims, along with the full scope of equivalents to which such claims are entitled.

While the aspects of the disclosure have been described in terms of various examples with their associated operations, a person skilled in the art would appreciate that a combination of operations from any number of different examples is also within scope of the aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An impact tool that is pneumatically driven by compressed air or gas, the impact tool comprising:
    a housing;
    an output shaft passing through the housing and configured to receive a socket;
    a pneumatically driven motor disposed within the housing, the pneumatically driven motor configured to rotate from the compressed air or gas and drive movement of the output shaft;
    an electric generator configured to generate electrical power from rotation of the pneumatically driven motor being driven by the compressed air or gas;
    a clutch to engage and disengage the electric generator to the pneumatically driven motor; and
    a light source configured to be electrically powered using the electrical power generated by the electric generator, the light source disposed on the housing and at least substantially encircling the output shaft.

2. The impact tool of claim 1, further comprising an impact mechanism coupled to the motor or a motor housing, the impact mechanism comprising one or more hammers and an anvil, wherein the impact mechanism is configured to be rotated by the pneumatically driven motor.

3. The impact tool of claim 2, wherein the electric generator comprises:
    a generator stator coupled to the motor housing and including one or more inductive coils; and a generator rotor coupled to the impact mechanism and comprising one or more magnets to be rotated relative to the generator stator for inducing the electrical power in the inductive coils, wherein rotation of the impact mechanism driven by the pneumatically driven motor causes the generator rotor to rotate and electromagnetically induce the generated electrical power in the generator stator.

4. The impact tool of claim 1, further comprising an energy storage device configured to electrically store the generated electrical power.

5. The impact tool of claim 4, wherein the energy storage device is at least one of a capacitor or a rechargeable battery.

6. The impact tool of claim 1, further comprising:
a trigger switch that may selectively be actuated by a user to rotate the pneumatically driven motor using the received compressed air or gas and electrically power the light source using the electrical power generated by the electric generator.

7. The impact tool of claim 6, wherein the trigger switch is configured to turn the light source on using the generated electrical power through a partial pull of the trigger switch, without causing rotation of the output shaft.

8. The impact tool of claim 1, further comprising:
an energy storage device configured to electrically store the generated electrical power for later supply to the light source;
a trigger switch for a user to selectively turn on the light source; and
a controller configured to supply the generated electrical power to the light source in response to the trigger switch being actuated.

9. The impact tool of claim 1, wherein the light source comprises a light emitting diode (LED) or liquid crystal display (LCD) ring.

10. The impact tool of claim 1, wherein the light source at least substantially encircling the output shaft has a formation selected from the group consisting of: a ring, a square, a rectangle, and a diamond.

11. An impact tool that is pneumatically driven by compressed air or gas, the impact tool comprising:
a housing;
an output shaft passing through the housing and configured to receive a socket;
a pneumatically driven motor disposed within the housing and configured to rotate from the compressed air or gas;
an impact mechanism configured to be rotated by the motor and consequently rotate the output shaft;
an electric generator configured to generate electrical power from rotation of the motor or the impact mechanism, the electric generator comprising a generator rotor and a generator stator;
a clutch to engage and disengage the generator rotor to the pneumatically driven motor; and
a light source configured to be electrically powered using the electrical power generated by the electric generator, the light source disposed on the housing and at least substantially encircling the output shaft.

12. The impact tool of claim 11, wherein the generator rotor and the generator stator define a magnetic impact gap therebetween either axially along a longitudinal axis through the impact mechanism and the output shaft or radially perpendicular said longitudinal axis.

13. The impact tool of claim 11, wherein the generator rotor includes magnets that are embedded in the impact mechanism.

14. The impact tool of claim 11, wherein the clutch comprises at least one of a centrifugal clutch, a plate clutch, or a cone clutch.

15. The impact tool of claim 11, wherein the light source at least substantially encircling the output shaft has a formation selected from the group consisting of: a ring, a square, a rectangle, and a diamond.

16. The impact tool of claim 11, wherein the light source at least substantially encircling the output shaft has a formation selected from the group consisting of: a ring, a square, a rectangle, and a diamond.

\* \* \* \* \*